United States Patent
Nakashima et al.

(10) Patent No.: US 11,710,855 B2
(45) Date of Patent: Jul. 25, 2023

(54) ALL-SOLID-STATE BATTERY, ELECTRONIC DEVICE, ELECTRONIC CARD, WEARABLE DEVICE, AND ELECTRIC MOTOR VEHICLE

(71) Applicant: Murata Manufacturing Co., Ltd., Nagaokakyo (JP)

(72) Inventors: Mamoru Nakashima, Nagaokakyo (JP); Masayuki Arimochi, Nagaokakyo (JP); Masamitsu Suzuki, Nagaokakyo (JP); Masahiro Morooka, Nagaokakyo (JP); Noriyuki Aoki, Nagaokakyo (JP); Keiko Hayashi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 717 days.

(21) Appl. No.: 16/576,989

(22) Filed: Sep. 20, 2019

(65) Prior Publication Data
US 2020/0014071 A1    Jan. 9, 2020

Related U.S. Application Data

(63) Continuation of application No. PCT/JP2018/014413, filed on Apr. 4, 2018.

(30) Foreign Application Priority Data

Apr. 4, 2017  (JP) ................................ 2017-074769

(51) Int. Cl.
*H01M 10/0525*    (2010.01)
*H01M 10/0562*    (2010.01)
(Continued)

(52) U.S. Cl.
CPC ......... *H01M 10/0585* (2013.01); *B60L 50/50* (2019.02); *B60L 58/12* (2019.02);
(Continued)

(58) Field of Classification Search
CPC ......... H01M 10/0585; H01M 10/0525; H01M 10/0562; H01M 2004/021;
(Continued)

(56) References Cited

U.S. PATENT DOCUMENTS

| 6,365,300 | B1 * | 4/2002 | Ota | H01M 10/0562 |
| | | | | 429/188 |
| 2009/0068563 | A1 * | 3/2009 | Kanda | H01M 10/0562 |
| | | | | 429/306 |
| 2018/0026300 | A1 * | 1/2018 | Shimizu | H01M 10/052 |
| | | | | 429/304 |

FOREIGN PATENT DOCUMENTS

| JP | 2014035818 A | 2/2014 |
| JP | 2014060124 A | 4/2014 |

(Continued)

OTHER PUBLICATIONS

International Search Report issued in PCT/JP2018/014413, dated Jul. 10, 2018.
(Continued)

*Primary Examiner* — Osei K Amponsah
(74) *Attorney, Agent, or Firm* — ArentFox Schiff LLP

(57) ABSTRACT

An all-solid-state battery is provided that includes a cathode layer, an anode layer, and a solid electrolyte layer, in which a porosity of the solid electrolyte layer is equal to or less than 10%. Moreover, the batter includes a surface roughness Rz1 of the cathode layer and a surface roughness Rz2 of the anode layer, such that Rz1+Rz2≤25.

19 Claims, 20 Drawing Sheets

(51) Int. Cl.
   *H01M 10/0585*    (2010.01)
   *B60L 50/50*      (2019.01)
   *B60L 58/12*      (2019.01)
   *H01M 4/587*      (2010.01)
   *H01M 4/02*       (2006.01)

(52) U.S. Cl.
   CPC ....... *H01M 4/587* (2013.01); *H01M 10/0525* (2013.01); *H01M 10/0562* (2013.01); *H01M 2004/021* (2013.01); *H01M 2004/027* (2013.01); *H01M 2300/0071* (2013.01); *H01M 2300/0094* (2013.01)

(58) Field of Classification Search
   CPC ... H01M 2004/027; H01M 2300/0071; H01M 2300/0094
   See application file for complete search history.

(56) References Cited

FOREIGN PATENT DOCUMENTS

| | | | |
|---|---|---|---|
| JP | 2015153507 | A | 8/2015 |
| JP | 2015195183 | A | 11/2015 |
| JP | 2016184483 | A | 10/2016 |
| WO | 2015037270 | A1 | 3/2015 |
| WO | 2016157751 | A1 | 10/2016 |

OTHER PUBLICATIONS

Written Opinion of the International Searching Authority issued in PCT/JP2018/014413, dated Jul. 10, 2018.

\* cited by examiner ations.
ALL-SOLID-STATE BATTERY, ELECTRONIC DEVICE, ELECTRONIC CARD, WEARABLE DEVICE, AND ELECTRIC MOTOR VEHICLE

CROSS REFERENCE TO RELATED APPLICATIONS

The present application is a continuation of PCT/JP2018/014413 filed Apr. 4, 2018, which claims priority to Japanese Patent Application No. 2017-074769, filed Apr. 4, 2017, the entire contents of each of which are incorporated herein by reference.

TECHNICAL FIELD

The present disclosure relates to an all-solid-state battery, an electronic device, an electronic card, a wearable device, and an electric motor vehicle.

BACKGROUND

In recent years, an all-solid-state battery with high safety has been attracting attention, replacing an organic electrolyte with an inorganic solid electrolyte. In the all-solid-state battery, technologies for improving battery characteristics by defining surface roughness of an electrode layer have been studied. Hereinafter, the technologies will be described.

Patent Document 1 (identified below) discloses an all-solid-state lithium ion secondary battery in which maximum roughness Rz of at least one of an interface between a cathode active material layer and an inorganic solid electrolyte layer or an interface between an anode active material layer and an inorganic solid electrolyte layer ranges from 1.5 μm to 5 μm.

Patent Document 2 (also identified below) discloses an all-solid-state battery including a cathode active material layer, an anode active material layer made of a layered amorphous $Li_4Ti_5O_{12}$ having ten-point average roughness Rz of 500 nm or less, a solid electrolyte layer sandwiched between a cathode active material layer and an anode active material layer.

Patent Document 3 (also identified below) discloses an all-solid-state lithium ion secondary battery in which when surface roughness Rmax formed by active material grains is defined on a surface of a solid electrolyte layer side of an electrode mixture layer, an average grain diameter of solid electrolyte grains forming the solid electrolyte layer is 0.1 times or more and less than 1.0 times of the Rmax, a thickness of the solid electrolyte layer is 5 times or more of the Rmax, and less than 100 times of the average grain diameter of the solid electrolyte grains forming the solid electrolyte layer.

Patent Document 1: Japanese Patent Application Laid-Open No. 2015-195183.
Patent Document 2: Japanese Patent Application Laid-Open No. 2015-153507.
Patent Document 3: Japanese Patent Application Laid-Open No. 2014-35818.

SUMMARY OF THE INVENTION

An object of the present invention is to provide an all-solid-state battery configured to suppress a short circuit between a cathode layer and an anode layer, an electronic device, an electronic card, a wearable device, and an electric motor vehicle.

Thus, according to an exemplary aspect, an all-solid-state battery is provided that includes a cathode layer, an anode layer, and a solid electrolyte layer, in which a porosity of the solid electrolyte layer is 10% or less. Moreover, the all-solid-state battery has surface roughness Rz1 of the cathode layer and a surface roughness Rz2 of the anode layer that satisfy a relationship of $Rz1+Rz2 \le 25$.

In an exemplary aspect, an electronic device is provided that is supplied with power from the exemplary all-solid-state battery.

In an exemplary aspect, an electronic card is provided that is supplied with power from the exemplary all-solid-state battery.

In an exemplary aspect, a wearable device is provided that is supplied with power from the exemplary all-solid-state battery.

In an exemplary aspect, an electric motor vehicle is provided that includes the exemplary all-solid-state battery, a conversion device which is supplied with power from the all-solid-state battery and converts the power into a driving force of a vehicle, and a control device that processes information on a vehicle control based on information on the all-solid-state battery.

According to the present technology, a short circuit between the cathode layer and the anode layer of the all-solid-state battery can be suppressed. However, it should be appreciated that the effects described herein are not necessarily limited, and may be any of the effects described in the present disclosure or effects different therefrom.

DETAILED DESCRIPTION

Embodiments, examples, and application examples will be described in the following procedure.

<1 First Embodiment>
[Overview]

According to the findings of the present inventors, (1) when irregularities on a surface of a cathode layer and a surface of an anode layer are large, the cathode layer and the anode layer are in contact with each other and easily short-circuited. In particular, when a solid electrolyte layer is thinned, the cathode layer and the anode layer tend to be short-circuited. (2) When the irregularities on the surface of the cathode layer and the surface of the anode layer are large, acceptability of Li ions on the surface of the anode layer becomes uneven, and Li dendrite tends to be precipitated on the surface of the anode layer. In this case, depending on the precipitated amount of Li dendrite, the dendrite and the cathode layer are likely to be in contact with each other, and the cathode layer and the anode layer are likely to be short-circuited. (3) Since the dendrite tends to grow in voids of the electrolyte, if a porosity of the solid electrolyte layer is large, there is a possibility that the dendrite and the cathode layer will be in contact with each other, and the cathode layer and the anode layer are short-circuited.

Therefore, in consideration of the above-mentioned points, the present inventors conducted an intensive study to suppress a short circuit between the cathode layer and the anode layer. As a result, it has been found that the porosity of the solid electrolyte layer is set to be 10% or less, and surface roughness Rz1 of the cathode layer and surface roughness Rz2 of the anode satisfy the relationship of Rz1+Rz2≤25. Hereinafter, the all-solid-state battery having such a structure will be described.

[Configuration of Battery]

Figure 1A:
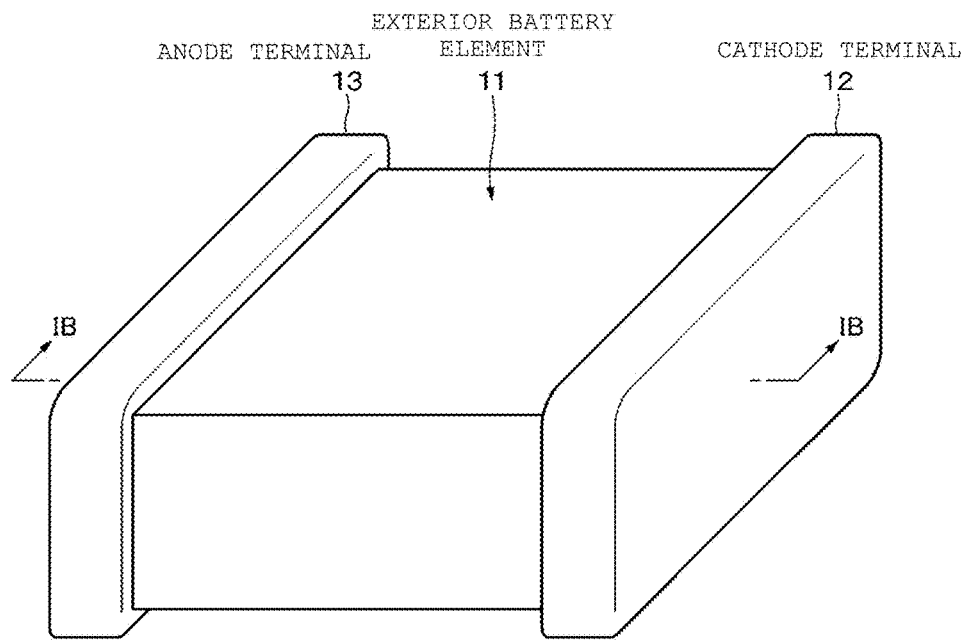
FIG. 1A is a perspective view illustrating an example of an appearance of a battery according to a first embodiment.
Figure 1B:
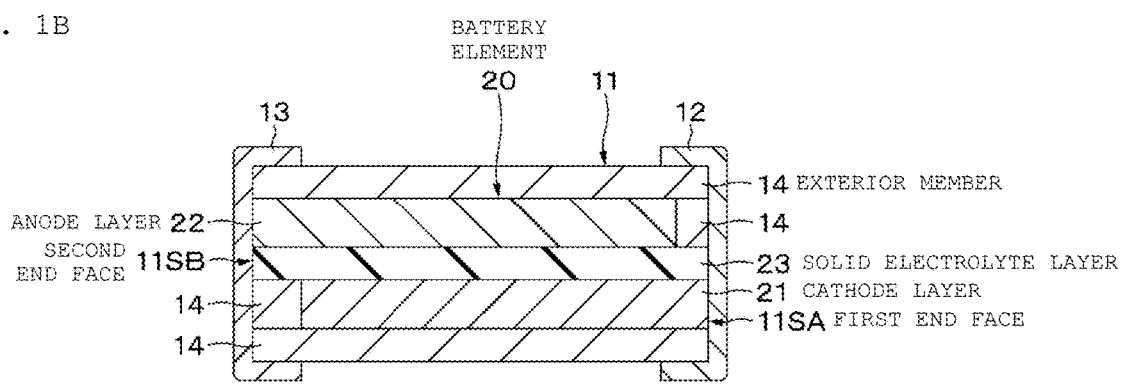
FIG. 1B is a cross-sectional view taken along the line IB-IB of FIG. 1A.

A battery according to a first embodiment is a so-called bulk type all-solid-state battery, and as illustrated in FIGS. 1A and 1B, includes a thin plate-like exterior battery element 11 having a first end face 11SA and a second end face 11SB opposite to the first end face 11SA, a cathode terminal 12 provided on the first end face 11SA, and an anode terminal 13 provided on the second end face 11SB. In the first embodiment, an exemplary aspect where a main surface of the exterior battery element 11 has a rectangular shape will be described, but it is noted that the shape of the main surface of the exterior battery element 11 is not limited thereto.

This battery is a secondary battery in which a battery capacity is repeatedly obtained by transferring Li which is an electrode reactant, and can be a lithium ion secondary battery in which a capacity of an anode is obtained by occluding and releasing lithium ions and may be a lithium metal secondary battery in which a capacity of an anode can be obtained by precipitating and dissolving lithium metal.

(Cathode Terminal and Anode Terminal)

The cathode and anode terminals 12 and 13 include, for example, a powder of conductive grains. The conductive grains may be sintered. The cathode terminal and the anode terminal 12 and 13 may further contain glass or glass ceramics as needed. The glass or the glass ceramics may be sintered.

Examples of the shape of the conductive grains include, for example, a spherical shape, an oval shape, a needle shape, a plate shape, a scaly shape, a tube shape, a wire shape, a rod shape, and an irregular shape or the like, but are not particularly limited thereto. It is noted that two or more grains having the above-mentioned shapes may be combined.

The conductive grains are metal grains, metal oxide grains, or carbon grains. Here, metal is defined as containing metalloid. Examples of the metal grains include at least one of silver (Ag), platinum (Pt), gold (Au), nickel (Ni), copper (Cu), palladium (Pd), aluminum (Al), and iron (Fe), but are not limited thereto.

Examples of the metal oxide grains include indium tin oxide (ITO), zinc oxide, indium oxide, antimony-added tin oxide, fluorine-added tin oxide, aluminum-added zinc oxide, gallium-added zinc oxide, silicon-added zinc oxide, a zinc oxide-tin oxide type, an indium oxide-tin oxide type, a zinc oxide-indium oxide-magnesium oxide type or the like, but are not limited thereto.

Examples of the carbon grains include carbon black, porous carbon, carbon fiber, fullerene, graphene, carbon nanotube, carbon micro coil, nano horn, or the like, but are not limited thereto. The glass is, for example, oxide glass. The glass ceramics is, for example, oxide glass ceramics.

(Exterior battery Element)

Figure 2:
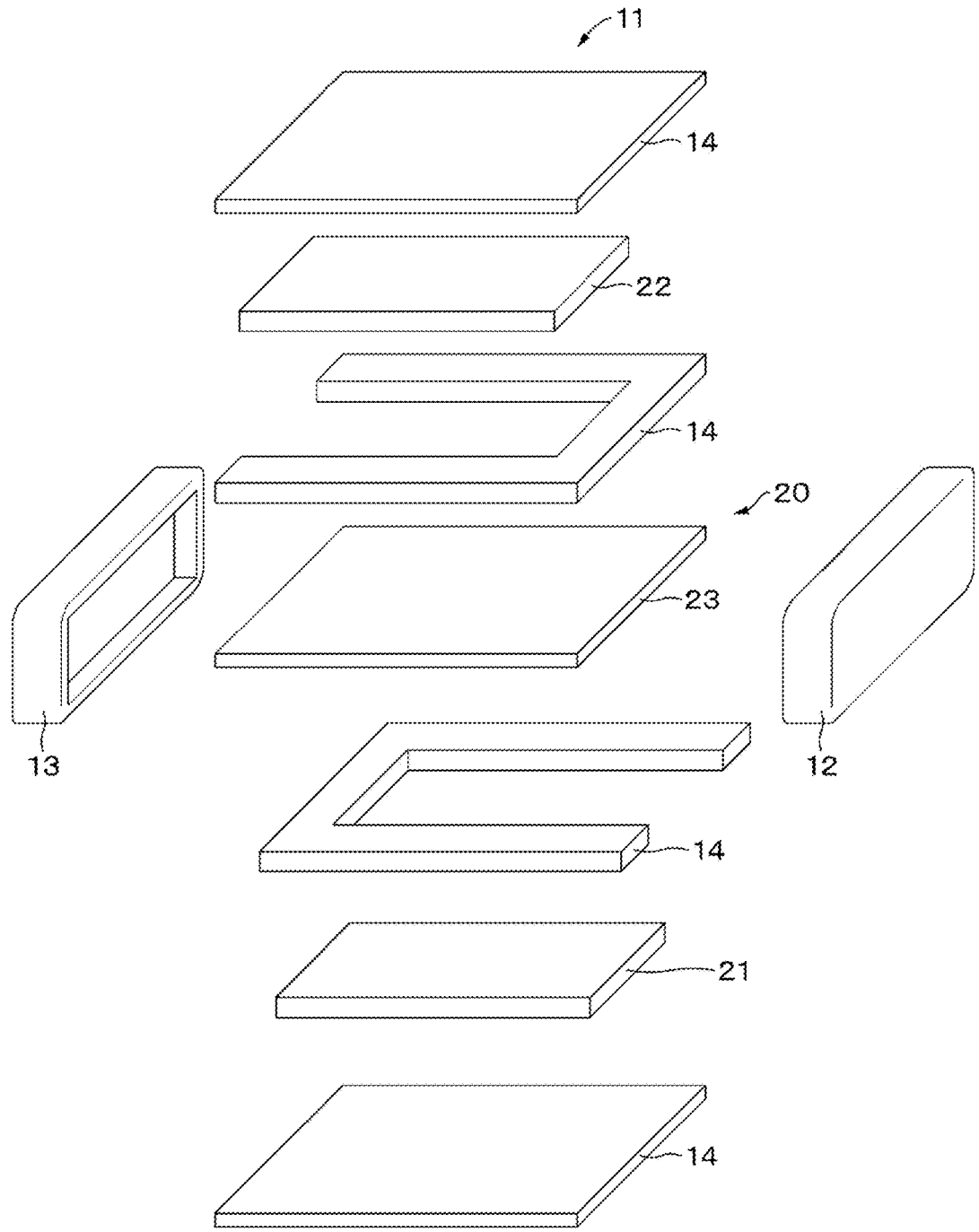
FIG. 2 is an exploded perspective view illustrating an example of a configuration of a battery according to the first embodiment.

As illustrated in FIGS. 1B and 2, the exterior battery element 11 includes a laminated battery element 20 and an exterior member 14 that covers a surface of the battery element 20.

(Battery Element)

As illustrated in FIGS. 1B and 2, the battery element 20 is a laminate including a cathode layer 21, an anode layer 22, and a solid electrolyte layer 23 provided between the cathode layer 21 and the anode layer 22.

(Exterior member)

The exterior member 14 covers the surface of the battery element 20 so that one end of the cathode layer 21 is exposed from the first end face 11SA, one end of the anode layer 22 is exposed from the second end face 11SB, and a peripheral portion of the solid electrolyte layer 23 is exposed from the entire end face of the exterior battery element 11. It is noted that the exterior member 14 may cover the surface of the battery element 20 so that the peripheral portion of the solid electrolyte layer 23 is not exposed from the entire end face of the exterior battery element 11.

The exterior member 14 contains oxide glass or oxide glass ceramics. It is possible to suppress moisture from permeating into the battery element 20 by covering the surface of the battery element 20 with the exterior member 14 containing such a material. Therefore, the atmospheric stability of the all-solid-state battery can be improved.

The exterior member 14 may further contain crystal grains. When the exterior member 14 further includes crystal grains, a contraction of the exterior member 14 is suppressed in a firing step of the exterior member 14 (at the time of cooling after firing, and the like), and a difference in a contraction ratio between the battery element 20 and the exterior member 14 can be reduced. Therefore, it is possible to suppress distortion and cracking of the exterior member 14 in the firing step of the exterior member 14.

Examples of the oxide glass and the oxide glass ceramics contain at least one of boron (B), bismuth (Bi), tellurium (Te), phosphorus (P), vanadium (V), tin (Sn), lead (Pb), and silicon (Si).

The exterior member 14 may contain a solid electrolyte. As the solid electrolyte, those similar to the solid electrolyte contained in the solid electrolyte layer 23 can be exemplified. It is noted that the solid electrolyte contained in the solid electrolyte layer 23 will be described below. A composition (type of material) or a composition ratio of the solid electrolyte contained in the solid electrolyte layer 23 and the exterior member 14 may be the same or different.

The crystal grains contain at least one of metal oxide, metal nitride, and metal carbide. Here, metal is defined as containing metalloid. More specifically, the crystal grains contain at least one of aluminum oxide:alumina ($Al_2O_3$), silicon oxide:quartz ($SiO_2$), silicon nitride (SiN), aluminum nitride (AlN), and silicon carbide (SiC).

A moisture permeability of the exterior member 14 is preferably 1 $g/m^2$/day or less, more preferably 0.75 $g/m^2$/day or less, and still more preferably 0.5 $g/m^2$/day or less from the viewpoint of improving the atmospheric stability of the battery.

The moisture permeability of the exterior member 14 described above is obtained as follows. First, a part of the exterior member 14 is extracted as a rectangular plate-like small piece from the battery by ion milling, polishing or the like. Next, a water vapor transmission rate (23° C., 90% RH) of the exterior member 14 is measured in accordance with JIS K 7129-C (ISO 15106-4).

An electrical conductivity (electron conductivity) of the exterior member 14 is preferably $1\times10^{-8}$ S/cm or less from the viewpoint of suppressing the self-discharge of the battery. The electrical conductivity of the exterior member 14 described above is obtained as follows. First, the sample is produced in the same manner as the above-mentioned method of measuring the Li ion conductivity. Next, the electrical conductivity is determined at room temperature (25° C.) by a two-terminal method using the produced sample.

An average thickness of the exterior member 14 is preferably 50 μm or less, more preferably 40 μm or less, and still more preferably 30 μm or less, from the viewpoint of improving an energy density of the battery. The average thickness of the exterior member 14 described above is obtained as follows. First, a cross section of the exterior member 14 is produced by the ion milling or the like, and a cross sectional scanning electron microscope (SEM) image is shot. Next, 10 points are randomly selected from this cross-sectional SEM image, the thickness of the exterior member 14 is measured at each point, and these measured values are simply averaged (e.g., arithmetic average) to obtain the average thickness of the exterior member 14.

(Solid Electrolyte Layer)

The solid electrolyte layer 23 contains a solid electrolyte. The solid electrolyte preferably includes oxide glass as lithium ion conductive glass, or oxide glass ceramics as lithium ion conductive glass ceramics. When the solid electrolyte contains the oxide glass or the oxide glass ceramics, the stability of the solid electrolyte layer 23 against the atmospheric air (moisture) can be improved. From the viewpoint of improving Li ion conductivity, the solid electrolyte preferably contains the oxide glass ceramics.

Here, the glass refers to crystallographically amorphous materials such as a halo observed by X-ray diffraction, electron beam diffraction and the like. The glass ceramics (crystallized glass) refers to crystallographically mixed amorphous and crystalline materials, such as peaks and halos observed by the X-ray diffraction, the electron beam diffraction, and the like.

From the viewpoint of improving the battery performance, the Li ion conductivity of the solid electrolyte is preferably $10^{-7}$ S/cm or more and more preferably $10^{-6}$ S/cm or more. The Li ion conductivity of the solid electrolyte can be obtained in the same manner as the method of measuring Li ion conductivity of the exterior member described above except that the solid electrolyte layer 23 is extracted from the battery by the ion milling, the polishing or the like and the measurement sample is produced using the extracted solid electrolyte layer 23.

The solid electrolyte contained in the solid electrolyte layer 23 is sintered. The sintering temperature of the oxide glass and the oxide glass ceramics which are the solid electrolyte is preferably 550° C. or lower, more preferably 300° C. or higher and 550° C. or lower, and still more preferably 300° C. or higher and 500° C. or lower.

When the sintering temperature is 550° C. or lower, the carbon material is prevented from being burned down in the sintering step, and therefore, the carbon material can be used as the anode active material. Therefore, the energy density of the battery can be further improved. In addition, when the cathode layer 21 contains a conductive auxiliary agent, the carbon material can be used as the conductive auxiliary agent. Therefore, a favorable electron conduction path can be formed in the cathode layer 21, and the conductivity of the cathode layer 21 can be improved. Even when the anode layer 22 contains a conductive auxiliary agent, the carbon material can be used as the conductive auxiliary agent, such that the conductivity of the anode layer 22 can be improved.

In addition, when the sintering temperature is 550° C. or lower, the solid electrolyte reacts with the electrode active material in the sintering step to be able to suppress byproducts such as a passivation from being formed. Therefore, the deterioration in the battery characteristics can be suppressed. In addition, if the sintering temperature is a low temperature of 550° C. or lower, the selection range of the type of electrode active material is expanded, such that the degree of freedom in the battery design can be improved.

On the other hand, when the sintering temperature is 300° C. or higher, a general binder such as an acrylic resin contained in the cathode layer precursor, the anode layer precursor, and the solid electrolyte layer precursor can be burned down in the sintering step.

The oxide glass and the oxide glass ceramics each are Li-containing oxide glass and Li-containing oxide glass-ceramics. Preferably, the Li-containing oxide glass and the Li-containing oxide glass ceramics have a sintering temperature of 550° C. or lower, have a high thermal contraction rate, and are rich in fluidity. This is because the following effects can be obtained. That is, the reaction between the solid electrolyte layer 23 and the cathode layer 21 and the reaction between the solid electrolyte layer 23 and the anode layer 22 can be suppressed. In addition, good interfaces are formed between the cathode layer 21 and the solid electrolyte layer 23, and between the anode layer 22 and the solid electrolyte layer 23, and an interface resistance between the cathode layer 21 and the solid electrolyte layer 23 and between the anode layer 22 and the solid electrolyte layer 23 can be reduced.

In an exemplary aspect, the oxide glass and the oxide glass ceramics preferably contain at least one of germanium (Ge), silicon (Si), boron (B) and phosphorus (P), lithium (Li), and oxygen (O), and more preferably contain Si, B, Li, and O. Specifically, the oxide glass and the oxide glass ceramics preferably contain at least one of germanium oxide ($GeO_2$), silicon oxide ($SiO_2$), boron oxide ($B_2O_3$), and phosphorus oxide ($P_2O_5$), and lithium oxide ($Li_2O$), and more preferably contain $SiO_2$, $B_2O_3$, and $Li_2O$. As described above, since the oxide glass and the oxide glass-ceramics containing at least one of Ge, Si, B, and P, Li, and O have a sintering temperature of 300° C. or higher and 550° C. or lower, have a high thermal contraction rate and is also rich in fluidity, it is advantageous from the viewpoint of reducing the interface resistance, improving the energy density of the battery, and the like.

Moreover, the content of $Li_2O$ is preferably 20 mol % to 75 mol %, more preferably 30 mol % or more and 75 mol % or less, still more preferably 40 mol % or more and 75 mol % or less, and particularly preferably 50 mol % or more and 75 mol % or less from the viewpoint of lowering the sintering temperature of the solid electrolyte.

When the solid electrolyte contains $GeO_2$, the content of $GeO_2$ is preferably more than 0 mol % and 80 mol % or less. When the solid electrolyte contains $SiO_2$, the content of $SiO_2$ is preferably more than 0 mol % and 70 mol % or less. When the solid electrolyte contains $B_2O_3$, the content of $B_2O_3$ is preferably more than 0 mol % and 60 mol % or less. When the solid electrolyte contains $P_2O_5$, the content of $P_2O_5$ is preferably more than 0 mol % and 50 mol % or less.

The content of each oxide is the content of each oxide in the solid electrolyte, and specifically, a ratio of the content (mol) of each oxide to the total amount (mol) of at least one of $GeO_2$, $SiO_2$, $B_2O_3$, and $P_2O_5$, and $Li_2O$ is shown in percentage units (mol %). The content of each oxide can be measured using inductively coupled plasma emission spectrometry (ICP-AES) or the like.

It is noted that the solid electrolyte may further contain an additive element as needed. Examples of the additional element contain at least one selected from the group consisting of sodium (Na), magnesium (Mg), aluminum (Al), potassium (K), calcium (Ca), titanium (Ti), vanadium (V), chromium (Cr), manganese (Mn), iron (Fe), cobalt (Co), nickel (Ni), copper (Cu), zinc (Zn), gallium (Ga), selenium (Se), rubidium (Rb), sulfur (S), yttrium (Y), zirconium (Zr), niobium (Nb), molybdenum (Mo), silver (Ag), indium (In), tin (Sn), antimony (Sb), cesium (Cs), vanadium (Ba), hafnium (Hf), tantalum (Ta), tungsten (W), lead (Pb), bismuth (Bi), gold (Au), lanthanum (La), neodymium (Nd), and europium (Eu). The solid electrolyte may contain at least one selected from the group consisting of these additive elements as oxide.

(Cathode Layer)

The cathode layer 21 contains a cathode active material and a solid electrolyte. The solid electrolyte may also have a function as a binder. The cathode layer 21 may further contain a conductive auxiliary agent as needed.

The cathode active material includes, for example, a cathode material capable of occluding and releasing lithium ions which are an electrode reactant. The cathode material is preferably a lithium-containing compound or the like from the viewpoint of obtaining the high energy density, but is not limited thereto. Examples of the lithium-containing compound include at least one of complex oxide (lithium transition metal complex oxide) containing lithium and a transition metal element as a constituent element, a phosphate compound (lithium transition metal phosphate compound) containing lithium and a transition metal element as a constituent element, or the like. Among those, the transition metal element is preferably one or more of Co, Ni, Mn, and Fe. As a result, when a higher voltage is obtained and the voltage of the battery can be increased, energy (Wh) of the battery having the same capacity (mAh) can be increased.

The lithium transition metal complex oxide is, for example, one represented by $Li_xM1O_2$ or $Li_yM2O_4$, or the like. More specifically, for example, the lithium transition metal complex oxide is $LiCoO_2$, $LiNiO_2$, $LiVO_2$, $LiCrO_2$, $LiMn_2O_4$, or the like. In addition, the lithium transition metal phosphate compound is, for example, one represented by $LizM_3PO_4$ or the like. More specifically, for example, the lithium transition metal phosphate compound is $LiFePO_4$ or $LiCoPO_4$ or the like. However, M1 to M3 are one or more transition metal elements, and values of x to z are optional.

In addition, examples of the cathode active material may include be, for example, oxide, disulfide, chalcogenide, and a conductive polymer. Examples of the oxide include titanium oxide, vanadium oxide, manganese dioxide and the like. Examples of the disulfide include titanium disulfide, molybdenum sulfide and the like. Examples of the chalcogenide include niobium selenide and the like. Examples of the conductive polymer include disulfide, polypyrrole, polyaniline, polythiophene, polyparastyrene, polyacetylene, polyacene, or the like.

As the solid electrolyte, those similar to the solid electrolyte contained in the solid electrolyte layer 23 can be exemplified. However, a composition (type of material) or a composition ratio of the solid electrolyte contained in the solid electrolyte layer 23 and the cathode layer 21 may be the same or different.

Examples of the conductive auxiliary agent include at least one of a carbon material, metal, metal oxide, a conductive polymer, and the like. As the carbon material, for example, at least one of graphite, carbon fiber, carbon black, carbon nanotube and the like can be used. As the carbon fiber, for example, vapor growth carbon fiber (VGCF) or the like can be used. As the carbon black, for example, at least one of acetylene black and ketjen black can be used. As the carbon nanotube, for example, single wall carbon nanotube (SWCNT) and multi-wall carbon nanotube (MWCNT) such as double wall carbon nanotube (DWCNT) and the like can be used. As the metal, for example, Ni powder and the like can be used. As the metal oxide, for example, $SnO_2$ and the like can be used. As the conductive polymer, for example, at least one of substituted or unsubstituted polyaniline, polypyrrole, polythiophene, and one or more (co) polymers selected from these can be used. In addition, the conductive auxiliary agent may be a material having conductivity, and is not limited to the above-mentioned example.

(Anode Layer)

The anode layer 22 contains an anode active material and a solid electrolyte. The solid electrolyte may also have a function as a binder. The anode layer 22 may further contain a conductive auxiliary agent as needed.

Examples of the anode active material include an anode material capable of occluding and releasing lithium ions which are an electrode reactant. From the viewpoint of obtaining high energy density, the anode material preferably contains at least one of a carbon material and a metal-based material, but is not limited thereto.

Examples of the carbon material include graphitizable carbon, non-graphitizable carbon, graphite, mesocarbon microbeads (MCMB), highly oriented graphite (HOPG) or the like.

The metal-based material is, for example, a material containing a metal element or a metalloid element capable of forming an alloy with lithium as a constituent element. More specifically, examples of the metal-based material include a simple substance such as silicon (Si), tin (Sn), aluminum (Al), indium (In), magnesium (Mg), boron (B), gallium (Ga), germanium (Ge), lead (Pb), bismuth (Bi), cadmium (Cd), silver (Ag), zinc (Zn), hafnium (Hf), zirconium (Zr), yttrium (Y), palladium (Pd), platinum (Pt) or the like, or one or more of alloys or compounds. However, the simple substance is not limited to the purity of 100%, and may contain a trace amount of impurities. Examples of the alloy or the compound include $SiB_4$, $TiSi_2$, SiC, $Si_3N_4$, $SiO_v$ ($0<v \leq 2$), LiSiO, $SnO_w$ ($0<w \leq 2$), $SnSiO_3$, LiSnO, $Mg_2Sn$, and the like.

The metal-based material may be a lithium-containing compound or lithium metal (simple substance of lithium). The lithium-containing compound is composite oxide (lithium transition metal composite oxide) containing lithium and a transition metal element as constituent elements. Examples of the composite oxide include $Li_4Ti_5O_{12}$, and the like.

As the solid electrolyte, those similar to the solid electrolyte contained in the solid electrolyte layer 23 can be exemplified. However, a composition (type of material) or a composition ratio of the solid electrolyte contained in the solid electrolyte layer 23 and the anode layer 22 may be the same or different.

As the conductive auxiliary agent, those similar to the conductive auxiliary agent contained in the above-described cathode active material layer 24B can be exemplified.

(Surface Roughness Rz1 and Rz2 of Cathode Layer and Anode Layer)

Figure 3:
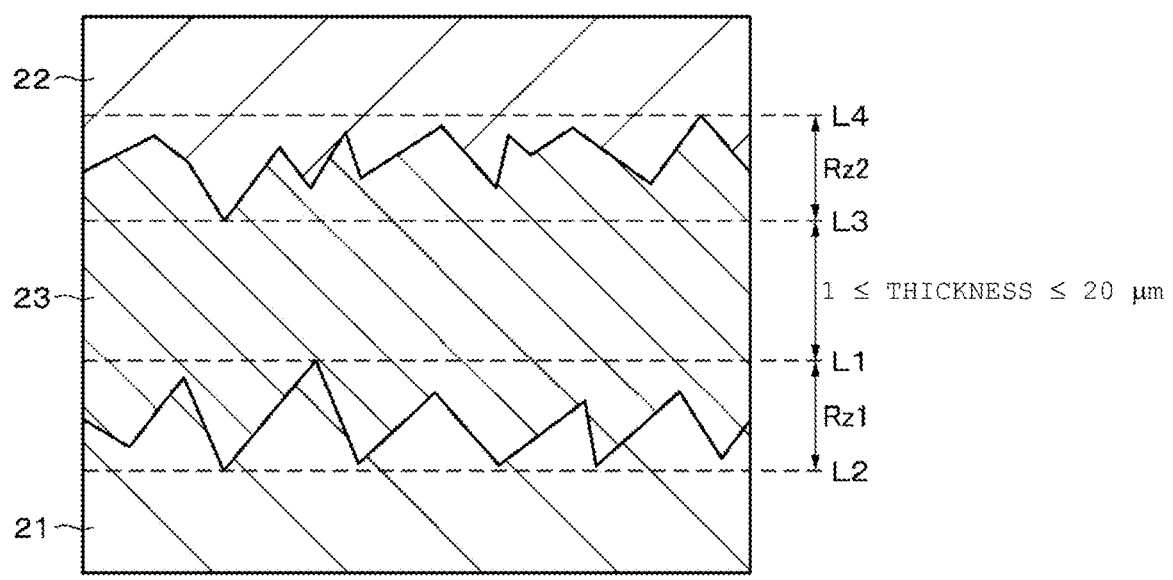
FIG. 3 is a schematic cross-sectional view for describing surface roughness Rz1 and Rz2 of a cathode layer and an anode layer.

As illustrated in FIG. 3, the cathode layer 21 has fine irregularities on the surface facing the anode layer 22. In addition, as illustrated in FIG. 3, the cathode layer 21 has fine irregularities on the surface facing the anode layer 22. According to the exemplary embodiment, the surface roughness Rz1 of the cathode layer 21 and the surface roughness Rz2 of the anode layer 22 satisfy the relationship of Rz1+Rz2≤25 μm, preferably Rz1+Rz2≤20 μm, still more preferably Rz1+Rz2≤18 μm, and particularly preferably Rz1+Rz2≤17 μm. Since the Rz1 and Rz2 satisfy the relationship of Rz1+Rz2≤25 μm, the contact between the cathode layer 21 and the anode layer 22, that is, the short circuit between the cathode layer 21 and the anode layer 22 can be suppressed. The effect of suppressing the short circuit from occurring is remarkable when the solid electrolyte layer 23 is thinned, particularly when the thickness of the solid electrolyte layer is reduced to 20 μm or less. In addition, since the Rz1 and Rz2 satisfy the relationship of Rz1+Rz2≤25 μm, it is possible to suppress the acceptability of Li ions in the anode layer 22 from being uneven and the Li dendrite from being precipitated Therefore, the short circuit between the cathode layer 21 and the anode layer 22 due to the dendrite can be suppressed.

In order to suppress the short circuit between the cathode layer 21 and the anode layer 22, the surface roughness Rz1 of the cathode layer 21 is preferably 15 μm or less, more preferably 12.5 μm or less, still more preferably 10 μm or less, particularly preferably 9 μm, and most preferably 8.5 μm or less. Moreover, to suppress the short circuit between the cathode layer 21 and the anode layer 22 and the like, the surface roughness Rz2 of the anode layer 22 is preferably 15 μm or less, more preferably 12.5 μm or less, still more preferably 10 μm or less, particularly preferably 9 μm, and most preferably 8.5 μm or less.

(Method of Measuring Surface Roughness Rz1, Rz2 of Cathode Layer and Anode Layer)

The surface roughness Rz1 and Rz2 of the cathode layer 21 and the anode layer 22 are measured as follows. First, the battery is cut in the direction perpendicular to its main surface, and then the cross section of the battery is polished by ion milling. Next, the interface between the cathode layer 21 and the solid electrolyte layer 23 and the interface between the anode layer 22 and the solid electrolyte layer 23 are shot by the SEM so that the field of view is greater than 200 μm×200 μm. Subsequently, the surface roughness Rz1 and Rz2 of the cathode layer 21 and the anode layer 22 are measured by image analysis software (e.g., analySISpro manufactured by Soft Imaging System GmbH).

Figure 4A:
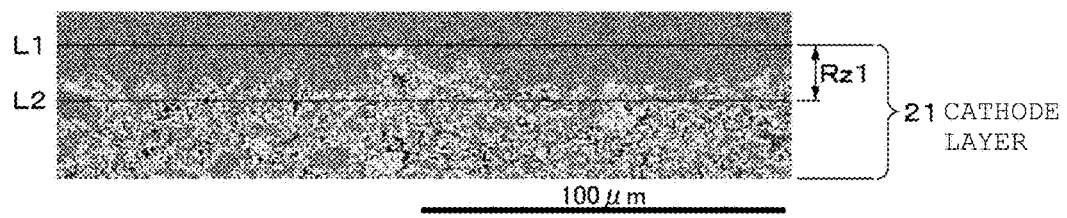
FIG. 4A is a SEM image for describing a method of measuring surface roughness Rz1 of a cathode layer.

Specifically, as illustrated in FIG. 4A, on the surface (the surface on the side facing the anode layer 22) of the cathode layer 21, a straight line L1 parallel to the cathode layer 21 so as to be in contact with an apex of a protruding part most protruding toward the anode layer 22 is drawn out and then a straight line L2 parallel to the cathode layer 21 so as to be in contact with a lowest point of a recessed part most recessed with respect to the anode layer 22 is drawn out. Therefore, the distance between these straight lines L1 and L2 is obtained, which becomes the surface roughness Rz1.

Figure 4B:
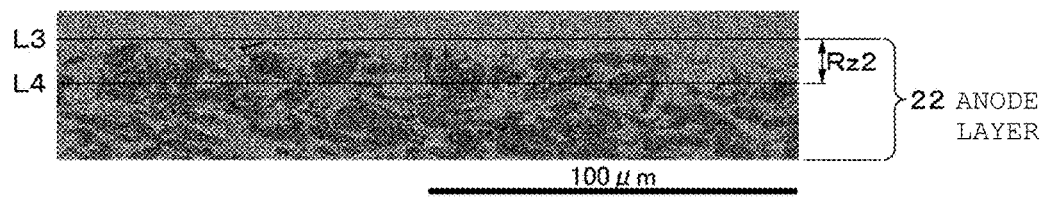
FIG. 4B is a SEM image for describing a method of measuring surface roughness Rz2 of an anode layer.

In addition, as illustrated in FIG. 4B, on the surface (i.e., the surface on the side facing the cathode layer 21) of the anode layer 22, a straight line L3 parallel to the anode layer 22 so as to be in contact with an apex of a protruding part most protruding toward the cathode layer 21 is drawn out and then a straight line L4 parallel to the anode layer 22 so as to be in contact with a lowest point of a recessed part most recessed with respect to the cathode layer 21 is drawn out.

Therefore, the distance between these the straight lines L3 and L4 is obtained, which becomes the surface roughness Rz2.

(Thickness of Solid Electrolyte Layer)

In order to improve the energy density of the battery, the thickness of the solid electrolyte layer 23 is preferably 20 μm or less, more preferably 15 μm or less, still more preferably 10 μm or less, and particularly preferably 8 μm or less. Moreover, to suppress the short circuit between the cathode layer 21 and the anode layer 22 due to the dendrite, the thickness of the solid electrolyte layer 23 is preferably 1 μm or more, more preferably 2 μm or more, still more preferably 3 μm or more, and particularly preferably 4 μm or more.

(Method of Measuring Thickness of Solid Electrolyte Layer)

Figure 4C:
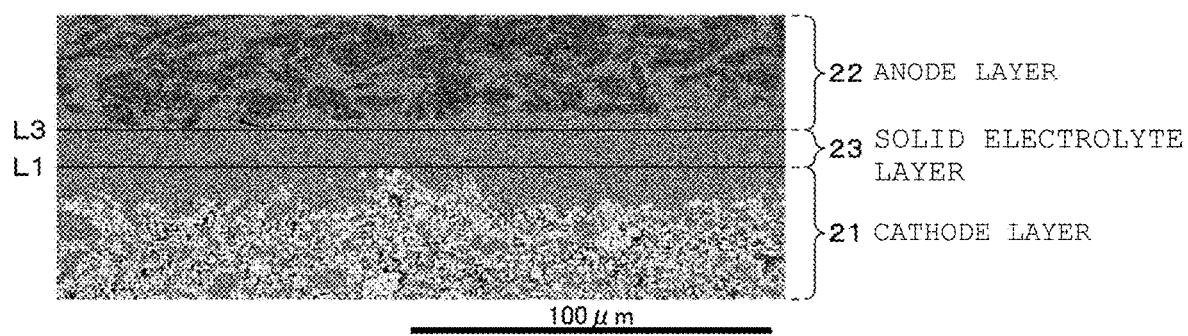
FIG. 4C is a SEM image for describing a method of measuring a thickness of a solid electrolyte layer.

The thickness of the solid electrolyte layer is measured as follows. First, as illustrated in FIG. 4C, the straight lines L1 and L3 are drawn out on the surfaces of the cathode layer 21 and the anode layer 22 in the same procedure as the above-described "method of measuring surface roughness Rz1 and Rz2 of a cathode layer and an anode layer". Subsequently, the distance between these straight lines L1 and L3 is obtained, which becomes the thickness of the solid electrolyte layer.

(Porosity of Solid Electrolyte Layer)

The porosity of the solid electrolyte layer 23 is 10% or less, preferably 7% or less, more preferably 5% or less, still more preferably 3% or less, and particularly preferably 1% or less. If the porosity of the solid electrolyte layer 23 is 10% or less, it is possible to suppress the short circuit between the cathode layer 21 and the anode layer 22 via the dendrite grown in the void of the solid electrolyte layer 23. The lower limit of the porosity of the solid electrolyte layer 23 is not particularly limited, and may be 0% or more, or 1% or more or 2% or more.

(Method of Measuring Porosity of Solid Electrolyte Layer)

Figure 5:
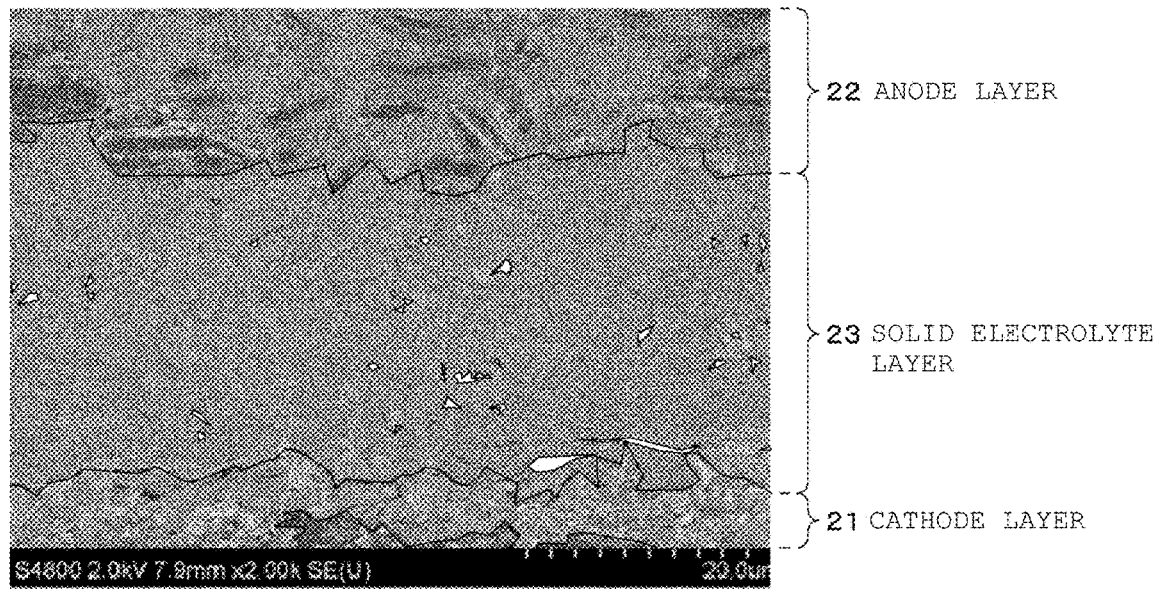
FIG. 5 is a SEM image for describing a method of measuring a porosity of a solid electrolyte layer.

The porosity of the solid electrolyte layer 23 is measured as follows. First, the battery is cut in the direction perpendicular to its main surface, and then the cross section of the battery is polished by ion milling. Next, the cross section of the solid electrolyte layer 23 is shot by the SEM such that the field of view is greater than 200 μm×200 μm. Subsequently, as illustrated in FIG. 5, a total area of the voids present in the cross section of the solid electrolyte layer 23 and a length (length of the cross section of a range where the total area of the voids is measured) of the solid electrolyte layer 23 are measured from a cross-sectional SEM image by the image analysis software (e.g., analySIS pro manufactured by Soft Imaging System GmbH). In addition, the thickness of the solid electrolyte layer is measured in the same manner as the "method of measuring a thickness of a solid electrolyte layer". Finally, the porosity of the solid electrolyte layer 23 is obtained from the following Equation using the above measured values.

(Porosity of solid electrolyte layer 23)[%]=(total area of voids present in cross section of solid electrolyte layer 23)/(area of solid electrolyte layer 23 in a range where total area of voids is measured)×100

However, the area of the solid electrolyte layer 23 in the range where the total area of the voids is measured was obtained from the following equation.

(Area of solid electrolyte layer 23 in range where total area of voids was measured)=(length of solid electrolyte layer 23 in range where total area of voids was measured)×(thickness of solid electrolyte layer 23)

[Operation of Battery]

In this battery, for example, the lithium ions released from the cathode layer 21 are incorporated into the anode layer 22 via the solid electrolyte layer 23 during charging, and lithium ions released from the anode layer 22 are incorporated into the cathode layer 21 via the solid electrolyte layer 23 during discharging.

[Method of Producing Battery]

Hereinafter, an example of a method of producing a battery according to the first embodiment will be described.

(Step of Preparing Paste for Forming Solid Electrolyte Layer)

After the solid electrolyte and the binder are mixed to prepare the mixture powder, the mixture powder is dispersed in a solvent to prepare a paste for forming a solid electrolyte layer (hereinafter, simply referred to as "electrolyte paste").

As the binder, for example, an organic binder such as an acrylic resin can be used. The solvent is not particularly limited as long as it can disperse the mixture powder, but it is preferable that the solvent be burned down in a temperature range lower than a sintering temperature of the paste for forming the solid electrolyte layer. As the solvent, for example, lower alcohols having 4 or less carbon atoms such as methanol, ethanol, isopropanol, n-butanol, sec-butanol, and t-butanol, aliphatic glycols such as ethylene glycol, propylene glycol (1,3-propanediol), 1,3-propanediol, 1,4-butanediol, 1,2-butanediol, 1,3-butanediol, and 2-methyl-1, 3-propanediol, ketones such as methyl ethyl ketone, amines such as dimethylethylamine, alicyclic alcohols such as terpineol, butyl acetate, and the like can be used alone or in a combination of two or more thereof, but the solvent is not particularly limited thereto. Examples of the dispersion method include stirring processing, ultrasonic dispersion processing, bead dispersion processing, kneading processing, homogenizer processing, and the like. Even in a step of preparing a paste for forming a cathode layer, a paste for forming an anode layer, a paste for forming an exterior member, and a conductive paste described below, as the binder and the solvent, the same material as the paste for forming the solid electrolyte layer can be exemplified.

(Step of Preparing Paste for Forming Cathode Layer)

After a cathode active material, a solid electrolyte, a binder, and if necessary, a conductive agent are mixed to prepare a mixture powder, the mixture powder is dispersed in a solvent to obtain a paste for forming a cathode active material layer (hereinafter, simply referred to as "cathode paste").

(Step of Preparing Paste for Forming Anode Layer)

After an anode material, a solid electrolyte, a binder, and if necessary, a conductive auxiliary agent are mixed to prepare the mixture powder, the mixture powder is dispersed in a solvent to obtain a paste for forming an anode layer (hereinafter, simply referred to as "anode paste").

(Step of Preparing Paste for Forming Exterior Member)

After a solid electrolyte, a binder, and if necessary, powder of crystal grains are mixed to prepare the mixture powder, the mixture powder is dispersed in the solvent to obtain a paste for forming an exterior member (hereinafter, simply referred to as "exterior paste").

(Step of Preparing Conductive Paste)

After a powder of conductive grains, the binder, and if necessary, the glass or the glass ceramics are mixed to prepare the mixture powder, the mixture powder is dispersed in the solvent to prepare a conductive paste for forming a cathode terminal and an anode terminal.

(Step of Producing Green Sheet for Forming Solid Electrolyte Layer)

First, a paste layer is formed by uniformly coating an electrolyte paste on a surface of a support substrate. As the support substrate, for example, polymeric resin films such as a polyethylene terephthalate (PET) film can be used. Here, the coating is defined as including printing. As the coating method, for example, a die coating method, a microgravure coating method, a wire bar coating method, a direct gravure coating method, a reverse roll coating method, a comma coating method, a knife coating method, a spray coating method, a curtain coating method, a dipping method, a spin coating method, a letterpress printing method, an offset printing method, a gravure printing method, an intaglio printing method, a rubber printing method, a screen printing method and the like can be used, but the coating method is not particularly limited thereto.

In order to make it easy to peel the green sheet (hereinafter, referred to as "electrolyte green sheet") for a solid electrolyte layer from the surface of the support substrate in a later step, the peeling processing on the surface of the support substrate is preferably performed in advance. Examples of the peeling processing include a method of coating or printing a composition for providing peelability, on a surface of a support substrate. Examples of the composition for providing peelability contains a binder as a main component and contains a paint to which wax, fluorine or the like is added, a silicone resin, or the like.

Next, by drying the paste layer, the electrolyte green sheet as the solid electrolyte layer precursor is produced on the surface of the support substrate. Examples of the drying method include natural drying, blast drying with hot air, heat drying with infrared rays or far infrared rays, vacuum drying, and the like. These drying methods may be used alone or in combination of two or more.

(Step of Producing Green Sheet for Forming Cathode Layer)

The green sheet for forming the cathode layer (hereinafter, referred to as "cathode green sheet") as the cathode layer precursor on the surface of the support substrate is produced in the same manner as the "step of producing a green sheet for forming a solid electrolyte layer" described above except that the cathode paste is used.

(Step of Producing Green Sheet for Forming Anode Layer)

The green sheet for forming the anode layer (hereinafter, referred to as "anode green sheet") as the anode layer precursor on the surface of the support substrate is produced in the same manner as the "step of producing a green sheet for forming a solid electrolyte layer" described above except that the anode paste is used.

(Step of Producing Green Sheet for Forming Exterior Member)

The green sheet for forming the exterior member (hereinafter, referred to as "exterior green sheet") as the exterior member precursor on the surface of the support substrate is produced in the same manner as the "step of producing a green sheet for forming a solid electrolyte layer" described above except that the exterior paste is used.

(Step of Producing Battery)

A battery having the configuration illustrated in FIGS. 1A, 1B and 2 is produced as follows. First, the cathode green sheet, the electrolyte green sheet, and the anode green sheet are cut together with their support substrates in a rectangular shape having a predetermined size. Note that lengths of four sides of the cathode green sheet and the anode green sheet are each slightly shorter than lengths of four sides of the electrolyte green sheet. After the cutting, the cathode green sheet, the electrolyte green sheet, and the anode green sheet are peeled off from the support substrate.

After the peeling, the cathode green sheet, the electrolyte green sheet, and the anode green sheet are laminated in this order to produce a laminate. Specifically, the cathode green sheet and the electrolyte green sheet overlap with each other so that a peripheral portion of one surface of the electrolyte green sheet is exposed in a U shape along three sides of the cathode green sheet. In addition, the anode green sheet and the electrolyte green sheet overlap with each other so that a peripheral portion of the other surface of the electrolyte green sheet is exposed in a U shape along three sides of the anode green sheet. At this time, the overlapping positions of the cathode green sheet, the electrolyte green sheet, and the anode green sheet are adjusted so that the U shape of the exposed portion on one surface and the U shape of the exposed portion on the other surface become in an opposite direction to each other.

Next, each green sheet which configures a laminate is pressure-bonded. Examples of the method of pressure bonding include a cold isostatic press (e.g., CIP) method, a hot press method, a warm isostatic press (e.g., WIP) method, and the like. Next, the binder contained in each green sheet which configures a laminate is burned (e.g., degreased) by heating the laminate. Thereafter, the solid electrolyte contained in each green sheet which configures the laminate is heated and sintered by firing the laminate. As a result, each of the cathode green sheet, the electrolyte green sheet, and the anode green sheet configuring the laminate is changed to the cathode layer 21, the solid electrolyte layer 23, and the anode layer 22. Thus, the battery element 20 is produced.

The firing temperature of the laminate is the sintering temperature of the solid electrolyte or higher, preferably the sintering temperature of the solid electrolyte or higher and 550° C. or lower, and more preferably the sintering temperature of the solid electrolyte or higher and 500° C. or lower. Here, the sintering temperature of the solid electrolyte means the sintering temperature of the solid electrolyte, when the solid electrolyte contained in the laminate is one type. On the other hand, when the solid electrolyte contained in the laminate is two or more types, the sintering temperature means the highest temperature among the sintering temperatures of those solid electrolytes.

When the sintering temperature of the laminate is equal to or higher than the sintering temperature of the solid electrolyte, the sintering of the solid electrolyte proceeds, so lithium ion conductivity of the cathode layer 21, the anode layer 22, and the solid electrolyte layer 23 can be improved. In addition, the strength of the cathode layer 21, the anode layer 22, and the solid electrolyte layer 23 can be increased. The reason for setting the sintering temperature of the laminate to 550° C. or less is the same as the reason for setting the sintering temperature of the solid electrolyte described above to 550° C. or lower.

When the solid electrolyte contained in the laminate before the firing step is oxide glass, the oxide glass may be changed into oxide glass ceramics in the firing step. By the change as described above, the Li ion conductivity of the solid electrolyte can be improved.

The surface roughness Rz1 and Rz2 of the cathode layer 21 and the anode layer 22, and the porosity of the solid electrolyte layer 23 can be changed, for example, by adjusting the following producing conditions (A) to (D).

(A) The porosity of the solid electrolyte layer 23 can be reduced as the amount of binder contained in the electrolyte paste is reduced.

(B) The surface roughness Rz1 and Rz2 of the cathode layer 21 and the anode layer 22 can be reduced as the grain size (average grain size D50) of the cathode active material and the anode active material is reduced.

(C) The surface roughness Rz1 and Rz2 of the cathode layer 21 and the anode layer 22 can be reduced as the viscosities of the cathode paste and the anode paste are reduced.

(D) The porosity of the solid electrolyte layer 23 and the surface roughness Rz1 and Rz2 of the cathode layer 21 and the anode layer 22 can be reduced as the sintering pressure is increased.

(Step of Forming Exterior Member)

First, the two exterior green sheets are cut into a U shape and peeled off from the support substrate, and then overlap on each of the U-shaped exposed portions formed on both surfaces of the solid electrolyte layer 23. Thereby, one end of the cathode layer 21 is exposed from the first end face 11SA, and one end of the anode layer 22 is exposed from the second end face 11SB. Next, the two exterior green sheets are cut into the same size and shape as the electrolyte green sheets and peeled off from the support substrate, and then the two main surfaces of the battery element 20 are covered with these green sheets. Next, the binder contained in the exterior green sheet is burned (degreased) by heating the exterior green sheet. Thereby, the exterior battery element 11 is obtained.

(Step of Forming Terminal)

First, the conductive paste is dipped in the first and second end faces 11SA and 11SB of the exterior battery element 11. Thereafter, the exterior battery element 11 is fired to sinter the conductive grains contained in the conductive paste. As a result, the targeted battery can be obtained.

[Effect]

The battery according to the first embodiment includes the cathode layer 21, the anode layer 22, and the solid electrolyte layer 23. The porosity of the solid electrolyte layer 23 is 10% or less, and the surface roughness Rz1 of the cathode layer 21 and the surface roughness Rz2 of the anode layer 22 satisfy the relationship of Rz1+Rz2≤25. As a result, short circuits between the cathode layer 21 and the anode layer 22 are suppressed during the assembly of the battery and the charging and discharging of the battery.

[Modified Example]

(Modified Example 1)

In the first embodiment, the example in which the unsintered battery element 20 is produced by laminating the green sheets is described, but the unsintered battery element 20 can be produced by coating a paste. Hereinafter, the step of producing the unsintered battery element 20 by the coating is described.

First, the cathode paste layer as the cathode layer precursor is formed by coating and drying the cathode paste so that the uncoated part is formed on one surface of the rectangular solid electrolyte green sheet along three sides of the surface. Next, the anode paste layer as the anode layer precursor is formed by coating and drying the anode paste so that the uncoated part is formed on the other surface of the rectangular solid electrolyte green sheet along three sides of the surface. At this time, the formation position of the uncoated part on one side and the other side of the solid electrolyte green sheet is adjusted so that the side on which the uncoated part is not formed is opposed to the side on which the uncoated part is not formed on the other surface of the solid electrolyte green sheet. Thus, the unsintered battery element 20 is obtained.

(Modified Example 2)

Figure 6:
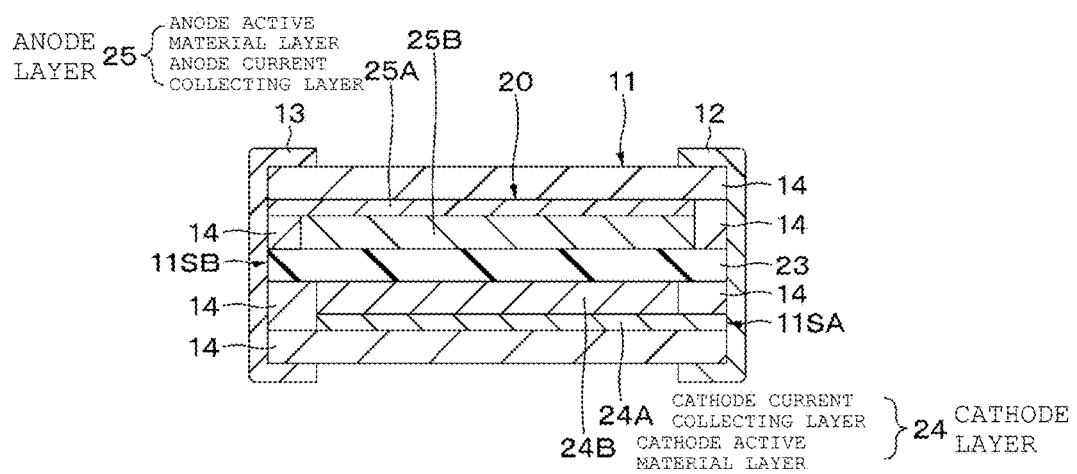
FIG. 6 is a cross-sectional view illustrating an example of a configuration of a battery according to a modified example of a first embodiment.
Figure 7:
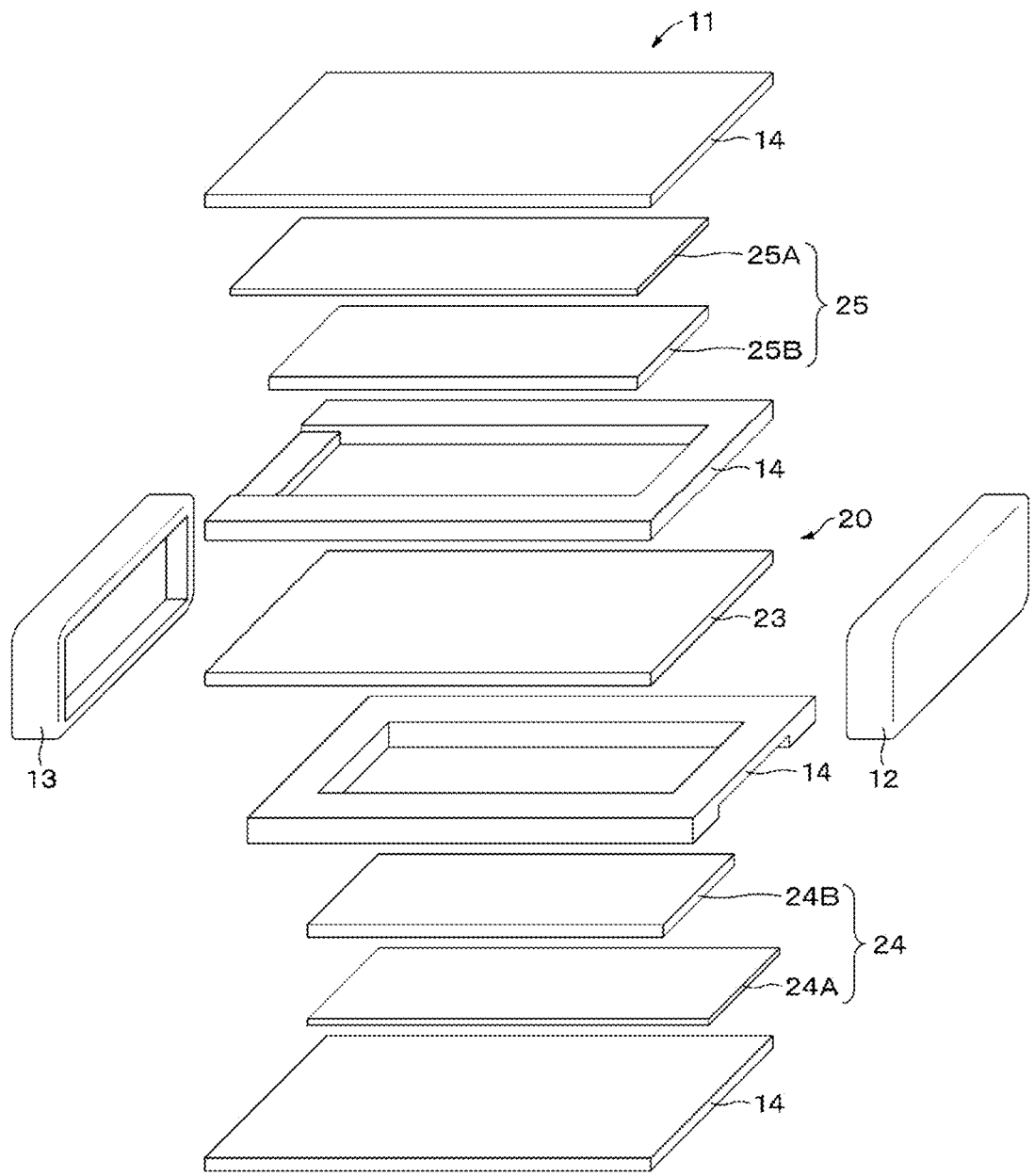
FIG. 7 is an exploded perspective view illustrating an example of a configuration of a battery according to the modified example of the first embodiment.

As illustrated in FIGS. 6 and 7, the cathode layer 24 includes the cathode current collecting layer 24A and the cathode active material layer 24B that is provided on the main surface of the side facing the anode layer 25, among both main surfaces of the cathode current collecting layer 24A. In addition, the anode layer 25 includes the anode current collecting layer 25A and the anode active material layer 25B which is provided on the main surface of the side facing the cathode layer 24, among both main surfaces of the anode current collecting layer 25A. It is noted that although FIG. 6 illustrates the configuration in which both the cathode layer 24 and the anode layer 25 include the current collecting layer and the active material layer, the configuration in which one of the cathode layer 24 and the anode layer 25 includes the current collecting layer and the active material layer may be employed.

(Cathode Current Collecting Layer)

The cathode current collecting layer 24A contains the conductive grain and the solid electrolyte. The solid electrolyte may also have a function as a binder. Examples of the conductive grain contain at least one of the carbon grain and the metal grain.

As the carbon grain, for example, at least one of graphite, carbon fiber, carbon black, carbon nanotube and the like can be used. As the carbon fiber, for example, vapor growth carbon fiber (VGCF) or the like can be used. As the carbon black, for example, at least one of acetylene black and ketjen black can be used. As the carbon nanotube, for example, single wall carbon nanotube (SWCNT) and multi-wall carbon nanotube (MWCNT) such as double wall carbon nanotube (DWCNT) and the like can be used. As the metal grain, for example, Ni grain and the like can be used. However, the conductive grain is not particularly limited to those described above.

As the solid electrolyte, those similar to the solid electrolyte contained in the solid electrolyte layer 23 can be exemplified. However, a composition (type of material) or a composition ratio of the solid electrolyte contained in the solid electrolyte layer 23 and the cathode current collecting layer 24A may be the same or different.

The cathode current collecting layer 24A may be, for example, a metal layer containing Al, Ni, stainless steel or the like. According to exemplary aspects, the shape of the metal layer can be, for example, a foil shape, a plate shape, or a mesh shape.

(Cathode Active Material Layer)

The cathode active material layer 24B contains the cathode active material and the solid electrolyte. The solid electrolyte may also have a function as a binder. The cathode active material layer 24B may also contain the conductive auxiliary agent as needed. The anode active material, the solid electrolyte, and the conductive auxiliary agent are the same as the cathode active material, the solid electrolyte, and the conductive support agent contained in the cathode layer 21 of the first embodiment, respectively.

(Anode Current collecting layer)

The anode current collecting layer 25A contains the conductive grain and the solid electrolyte. The solid electrolyte may also have a function as a binder. As the conductive grain, those similar to the conductive grain contained in the cathode current collecting layer 24A can be exemplified. As the solid electrolyte, the solid electrolyte contained in the solid electrolyte layer 23 of the first embodiment can be exemplified. However, a composition (type of material) or a composition ratio of the solid electrolyte contained in the solid electrolyte layer 23 and the anode current collecting layer 25A may be the same or different.

(Anode Active Material Layer)

The anode active material layer 25B contains the anode active material and the solid electrolyte. The solid electrolyte may also have a function as a binder. The anode active material layer 25B may further contain the conductive auxiliary agent as needed. The anode active material, the solid electrolyte, and the conductive auxiliary agent are the same as the anode active material, the solid electrolyte, and the conductive auxiliary agent contained in the anode layer 22 of the first embodiment, respectively.

(Modified Example 3)

Figure 8:
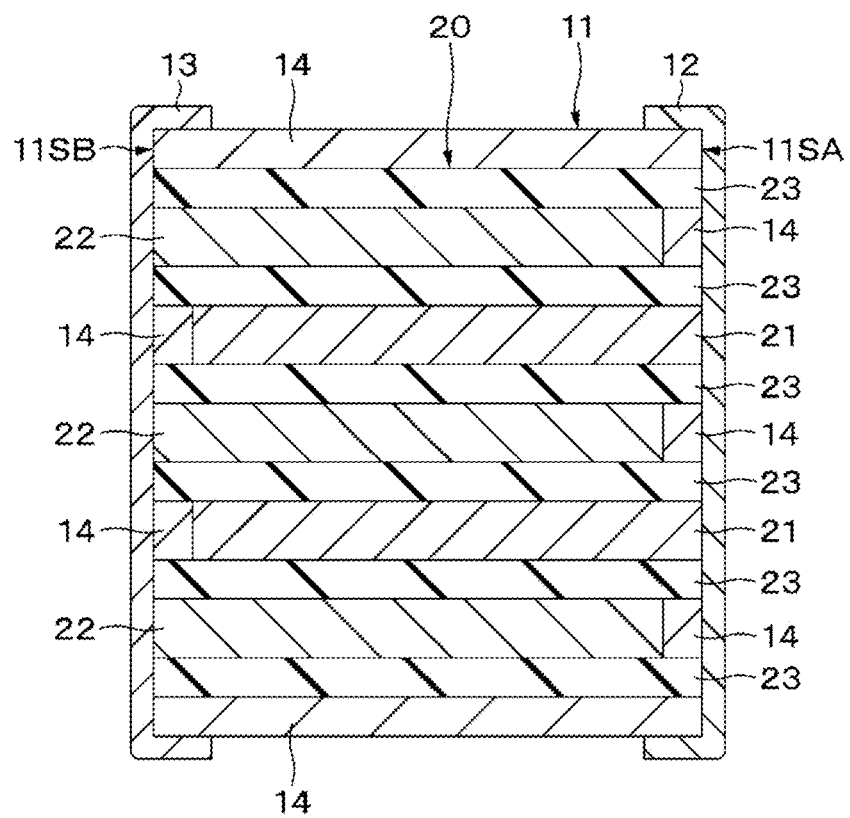
FIG. 8 is a cross-sectional view illustrating an example of a configuration of a battery according to the modified example of the first embodiment.

In the first embodiment, the configuration in which the battery element 20 includes the one-layer cathode layer 21, the one-layer anode layer 22, and the one-layer solid electrolyte layer 23 has been described, but the number of layers of the cathode layer 21, the anode layer 22, and the solid electrolyte layer 23 is not particularly limited as long as the configuration of the battery element 20 may be the configuration in which the cathode layer 21 and the anode layer 22 are stacked with the solid electrolyte layer 23 interposed therebetween. That is, as illustrated in FIG. 8, the battery element 20 may have the configuration including the plurality of cathode layers 21, the plurality of anode layers 22, and the plurality of solid electrolyte layers 23. It is noted that the battery element 20 can include the cathode layer which includes the current collecting layer and the cathode active layer provided on both surfaces of the cathode current collecting layer, instead of the cathode layer 21, and include the anode layer which includes the anode current collecting layer and the anode active material layer provided on both surfaces of the anode current collecting layer. In addition, the battery element 20 may include the solid electrolyte layer 23 on each of both the main surfaces, or may include the solid electrolyte layer 23 on one of the main surfaces.

(Modified Example 4)

The solid electrolyte contained in the cathode layer 21, the anode layer 22, and the solid electrolyte layer 23 is not particularly limited to the solid electrolyte (lithium ion conductive glass or lithium ion conductive glass ceramic) of the first embodiment. As solid electrolytes other than the solid electrolyte of the first embodiment, for example, a perovskite type oxide crystal formed of La—Li—Ti—O and the like, a garnet type oxide crystal formed of Li—La—Zr—O and the like, a phosphate compound (LATP) containing lithium, aluminum, and titanium as a constituent element, a phosphate compound (LAGP) containing lithium, aluminum, and germanium as a constituent element, and the like can be used.

In addition, sulfide such as $Li_2S$—$P_2S_5$, $Li_2S$—$SiS_2$—$Li_3PO_4$, $Li_{3.25}Ge_{0.25}P_{0.75}S$, or $Li_{10}GeP_2S_{12}$ or oxide such as $Li_7La_3Zr_2O_{12}$, $Li_{6.75}La_3Zr_{1.75}Nb_{0.25}O_{12}$, $Li_6BaLa_2Ta_2O_{12}$, $Li_{1+x}Al_xTi_{2-x}(PO_4)_3$, or $La_{2/3-x}Li_{3x}TiO_3$ can also be used. In addition, the oxide crystal (lithium ion conductive crystal) which crystallizes the oxide glass of the first embodiment can also be used.

<2 Second Embodiment>

[Configuration of Battery]

Figure 9A:
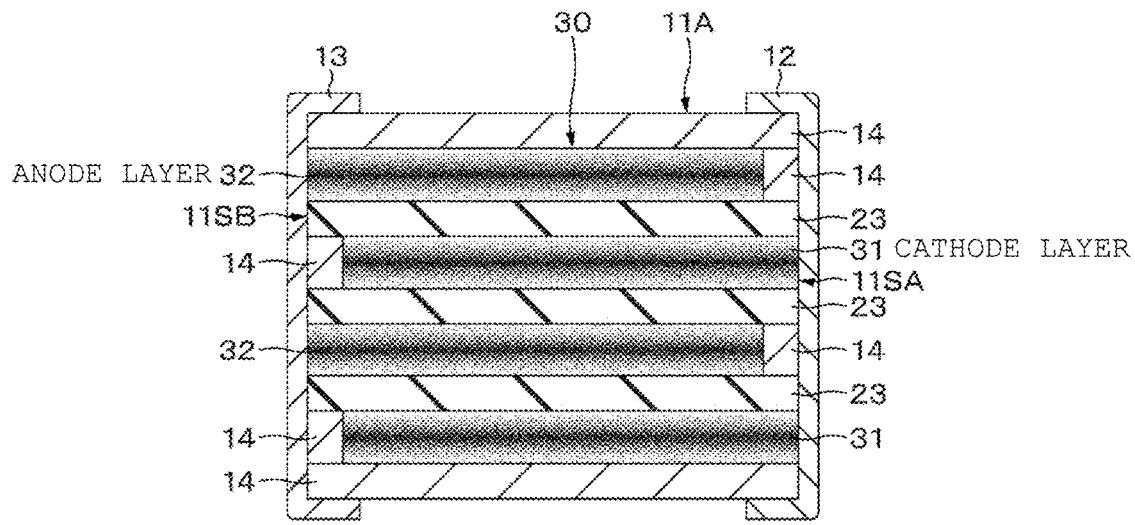
FIG. 9A is a cross-sectional view illustrating an example of a concentration distribution of a conductive auxiliary agent contained in the cathode layer and the anode layer.

As illustrated in FIG. 9A, a battery according to a second embodiment includes a thin plate-like exterior battery element 11A having a first end face 11SA and a second end face 11SB opposite to the first end face 11SA, a cathode terminal 12 provided on the first end face 11SA, and an anode terminal 13 provided on the second end face 11SB. The exterior battery element 11A includes a laminated battery element 30 and an exterior member 14 which covers a surface of the battery element 30. In the second embodiment, it is noted that the same parts as those of the first embodiment are denoted by the same reference numerals, and the description thereof will be omitted.

The battery element 30 is a laminate including a plurality of cathode layers 31, a plurality of anode layers 32, and a plurality of solid electrolyte layers 23 provided between the cathode layer 21 and the anode layer 22.

(Cathode Layer)

The cathode layer 31 contains a cathode active material, a solid electrolyte, and a conductive auxiliary agent. The cathode active material, the solid electrolyte, and the conductive auxiliary agent contained in the cathode layer 31 may be the same as the cathode active material, the solid electrolyte and the conductive auxiliary agent contained in the cathode layer 21 of the first embodiment, respectively.

As illustrated in FIG. 9A, the conductive auxiliary agent contained in the cathode layer 31 has a concentration distribution which changes in the thickness direction of the cathode layer 31. FIG. 9A illustrates that the contrast applied to the cathode layer 31 corresponds to the concentration of the conductive auxiliary agent, and the higher the thick portion of the contrast, the higher the concentration of the conductive auxiliary agent.

The concentration of the conductive auxiliary agent in the cathode layer 31 (for example, the central part of the cathode layer 31 in the thickness direction of the cathode layer 31) is higher than that of the conductive auxiliary agent on both main surfaces of the cathode layer 31. Specifically, the concentration of the conductive auxiliary agent in the cathode layer 31 increases from both main surfaces of the cathode layer 31 toward the inside of the cathode layer 31 (for example, the central part of the cathode layer 31 in the thickness direction of the cathode layer 31). As a result, electrons rapidly moves from one end of the cathode layer 31 as the cathode terminal 12 side to the other end of the cathode layer 31 as the opposite side of the cathode terminal 12 side through the inside of the cathode layer 31 having a high concentration of conductive auxiliary agent.

Figure 9B:
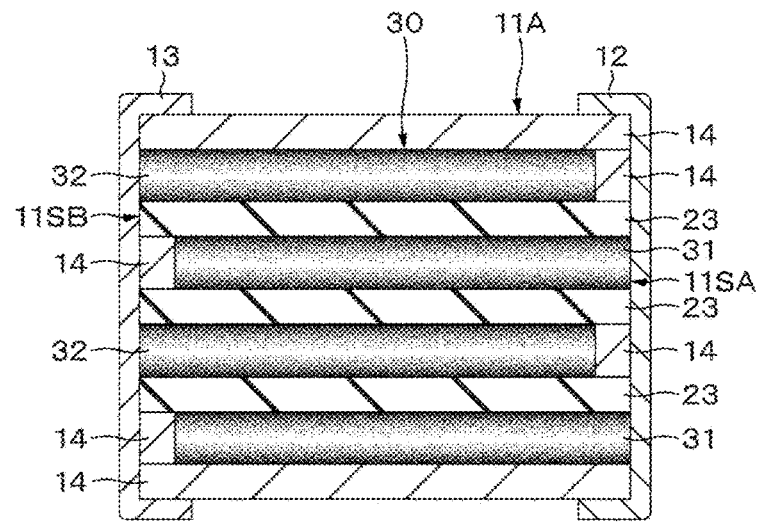
FIG. 9B is a cross-sectional view illustrating an example of the concentration distribution of an active material contained in the cathode layer and the anode layer.

As illustrated in FIG. 9B, the cathode active material contained in the cathode layer 31 has a concentration distribution which changes in the thickness direction of the cathode layer 31. FIG. 9B illustrates that the contrast applied to the cathode layer 31 corresponds to the concentration of the cathode active material, and the higher the thick portion of the concentration, the higher the contrast of the cathode active material.

According to an exemplary aspect, it is preferable that the concentration of the cathode active material on both main surfaces of the cathode layer 31 be higher than the concentration of the cathode active material in the inside of the cathode layer 31 (for example, the central part of the cathode layer 31 in the thickness direction of the cathode layer 31). Specifically, it is preferable that the concentration of the cathode active material in the cathode layer 31 increases from the inside of the cathode layer 31 (for example, the central part of the cathode layer 31 in the thickness direction of the cathode layer 31) toward both main surfaces of the cathode layer 31.

In a general cathode layer (that is, a cathode layer in which the concentration of the cathode active material is constant in the thickness direction of the cathode layer), an unused cathode active material that does not contribute to energy tends to be present. On the other hand, the cathode active material has the concentration distribution as described above, so it is possible to reduce the unused cathode active material which does not contribute to energy (when the cathode active material is a non-conductive active material, it also does not contribute to conductivity). Further, the concentration of the conductive auxiliary agent in the cathode layer 31 can also be higher than the concentration of the conductive auxiliary agent on the main surface of the cathode layer 31.

Moreover, it is preferable that the solid electrolyte contained in the cathode layer 31 preferably has a concentration distribution that changes in the thickness direction of the cathode layer 31. Specifically, since the solid electrolyte contained in the cathode layer 31 is responsible for ion transport to the cathode active material, it is preferable that the solid electrolyte contained in the cathode layer 31 has the same concentration distribution as that of the cathode active material.

In addition, it is preferable that the concentration of the solid electrolyte on both main surfaces of the cathode layer 31 be higher than the concentration of the solid electrolyte in the inside of the cathode layer 31 (for example, the central part of the cathode layer 31 in the thickness direction of the cathode layer 31). Specifically, it is preferable that the concentration of the solid electrolyte in the cathode layer 31 increases from the inside of the cathode layer 31 (for example, the central part of the cathode layer 31 in the thickness direction of the cathode layer 31) toward both main surfaces of the cathode layer 31.

(Anode Layer)

The anode layer 32 contains the anode active material, the solid electrolyte, and the conductive auxiliary agent. The anode active material, the solid electrolyte, and the conductive auxiliary agent contained in the anode layer 32 may be the same as the anode active material, the solid electrolyte and the conductive auxiliary agent contained in the anode layer 22 of the first embodiment, respectively.

As illustrated in FIG. 9A, the conductive auxiliary agent contained in the anode layer 32 has a concentration distribution which changes in the thickness direction of the anode layer 32. FIG. 9A illustrates that the contrast applied to the anode layer 32 corresponds to the concentration of the conductive auxiliary agent, and the higher the thick portion of the contrast, the higher the concentration of the conductive auxiliary agent.

The concentration of the conductive auxiliary agent in the anode layer 32 (for example, the central part of the anode layer 32 in the thickness direction of the anode layer 32) is higher than that of the conductive auxiliary agent on both main surfaces of the anode layer 32. Specifically, the concentration of the conductive auxiliary agent in the anode layer 32 increases from both main surfaces of the anode layer 32 toward the inside of the anode layer 32 (for example, the central part of the anode layer 32 in the thickness direction of the anode layer 32). Thus, electrons can rapidly move to the anode terminal 13 through the inside of the anode layer 32 having a high concentration of conductive auxiliary agent.

As illustrated in FIG. 9B, the anode active material contained in the anode layer 32 has a concentration distribution which changes in the thickness direction of the anode layer 32. FIG. 9B illustrates that the contrast applied to the anode layer 32 corresponds to the concentrations of each of the anode active materials, and the higher the thick portion of the contrast, the higher the concentration of the anode active material layer.

In an exemplary aspect, it is preferable that the concentration of the anode active material on both main surfaces of the anode layer 32 be higher than the concentration of the anode active material in the inside of the anode layer 32 (for example, the central part of the anode layer 32 in the thickness direction of the anode layer 32). Specifically, the concentration of the anode active material in the anode layer 32 increases from the inside of the anode layer 32 (for example, the central part of the anode layer 32 in the thickness direction of the anode layer 32) toward both main surfaces of the anode layer 32.

In a general anode layer (that is, an anode layer in which the concentration of the anode active material is constant in the thickness direction of the anode layer), an unused anode active material that does not contribute to energy tends to be present. On the other hand, the anode active material has the concentration distribution as described above, so it is possible to reduce the unused anode active material which does not contribute to energy (when the anode active material is a non-conductive active material, it also does not contribute to conductivity). Further, the concentration of the conductive auxiliary agent in the anode layer 32 can also be higher than the concentration of the conductive auxiliary agent on the main surface of the anode layer 32.

Moreover, it is preferable that the solid electrolyte contained in the anode layer 32 preferably has a concentration distribution that changes in the thickness direction of the anode layer 32. Specifically, since the solid electrolyte contained in the anode layer 32 is responsible for ion transport to the anode active material, it is preferable that the solid electrolyte contained in the anode layer 32 has the same concentration distribution as that of the anode active material.

In addition, it is preferable that the concentration of the solid electrolyte on both main surfaces of the anode layer 32 be higher than the concentration of the solid electrolyte in the inside of the anode layer 32 (for example, the central part of the anode layer 32 in the thickness direction of the anode layer 32). Specifically, the concentration of the solid electrolyte in the anode layer 32 increases from the inside of the anode layer 32 (for example, the central part of the anode layer 32 in the thickness direction of the anode layer 32) toward both main surfaces of the anode layer 32.

(Change in Concentration)

Figure 10A:
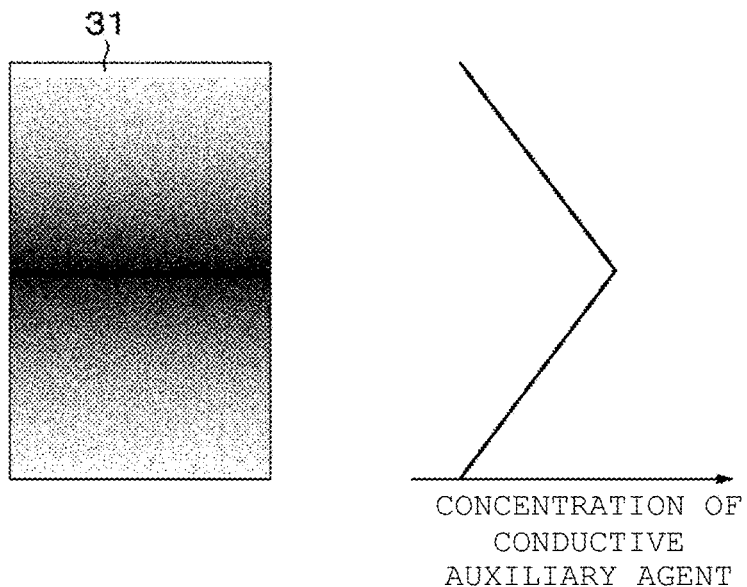
FIG. 10A is a schematic diagram illustrating an example of a continuous concentration distribution of the conductive auxiliary agent.
Figure 10B:
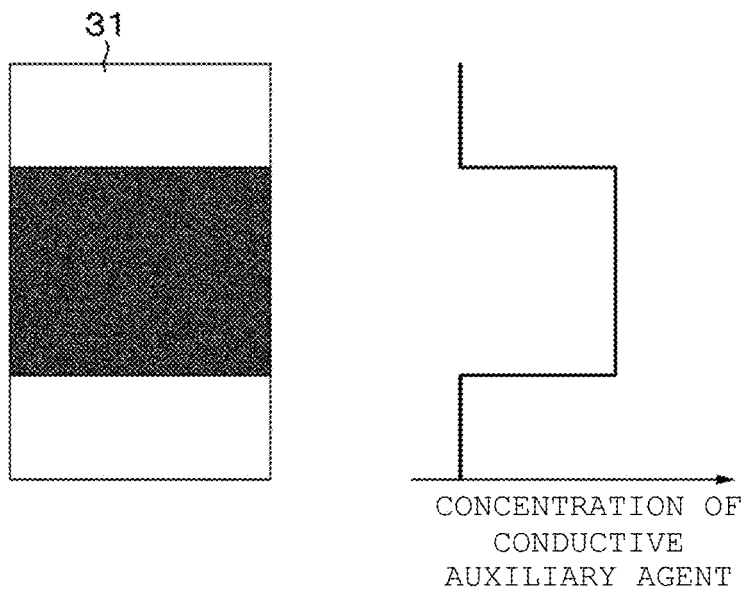
FIG. 10B is a schematic diagram illustrating an example of a discontinuous concentration distribution of the conductive auxiliary agent.

The change in concentrations of the conductive auxiliary agent, the cathode active material, the anode active material, and the solid electrolyte may be continuous or discontinuous. The discontinuous change in concentration includes a step-shaped change in concentration, but is not limited thereto. FIG. 10A illustrates an example in which the change in concentration of the conductive auxiliary agent in the cathode layer 31 in the thickness direction of the cathode layer 31 is continuous. On the other hand, FIG. 10B illustrates an example in which the change in concentration of the conductive auxiliary agent in the cathode layer 31 in the thickness direction of the cathode layer 31 is discontinuous (specifically, step shape).

[Method of Producing Battery]

Examples of the method for producing a battery having the above configuration include (A) a method for producing a battery by a green sheet lamination method, and (B) a method for producing a battery by a coating method. Hereinafter, these method of producing a battery will be described.

(A) Method of Producing Battery by Green Sheet Lamination Method (Step of Producing First Laminate)

The cathode layer 31 in which the concentration distribution of the conductive auxiliary agent changes in the thickness direction of the cathode layer 31 is produced as follows. First, a plurality of cathode pastes having different concentrations of conductive auxiliary agents are prepared. Next, a first laminate is produced by producing a plurality of cathode green sheets having different concentrations of conductive auxiliary agents in the same manner as the "step of producing a green sheet for forming a cathode layer" of the first embodiment except that these pastes are used and laminating these cathode green sheets. In this case, the plurality of cathode green sheets having different concentrations of conductive auxiliary agents are laminated so that the concentration of the conductive auxiliary agent in the cathode green sheet positioned inside the first laminate (for example, in the central part of the cathode layer 31 in the thickness direction of the cathode layer 31) is higher than the concentration of the conductive auxiliary agent in the cathode green sheet positioned on both main surfaces of the first laminate. Specifically, the plurality of green sheets having different concentrations of conductive auxiliary agents are laminated so that the concentration of the conductive auxiliary agent in the first laminate increases from both main surfaces of the first laminate toward the inside of the first laminate (for example, the central part of the cathode layer 31 in the thickness direction of the cathode layer 31).

(Step of Producing Second Laminate)

The anode layer 32 in which the concentration distribution of the conductive auxiliary agent changes in the thickness direction of the anode layer 32 is produced as follows. First, a plurality of anode pastes having different concentrations of conductive auxiliary agents are prepared. Next, a second laminate is produced by producing a plurality of anode green sheets having different concentrations of conductive auxiliary agents in the same manner as the "step of producing a green sheet for forming an anode layer" of the first embodiment except that these pastes are used and laminating these anode green sheets. In this case, the plurality of anode green sheets having different concentrations of conductive auxiliary agents are laminated so that the concentration of the conductive auxiliary agent in the anode green sheet positioned inside the second laminate (for example, in the central part of the anode layer 32 in the thickness direction of the anode layer 32) is higher than the concentration of the conductive auxiliary agent in the anode green sheet positioned on both main surfaces of the second laminate. Specifically, the plurality of green sheets having different concentrations of conductive auxiliary agents are laminated so that the concentration of the conductive auxiliary agent in the second laminate increases from both main surfaces of the second laminate toward the inside of the second laminate (for example, the central part of the anode layer 32 in the thickness direction of the anode layer 32).

(Step of Producing Battery)

A battery is produced in the same manner as the "step of producing a battery" in the first embodiment except that the first laminate and the second laminate obtained as described above are used instead of the cathode green sheet and the anode green sheet. It is noted that before the step of producing the battery, the solid electrolyte contained in each green sheet configuring the first and second laminates may be heated and sintered by burning (degreasing) the binder contained in each of the green sheets configuring the first and second laminates and then firing the first and second laminates.

The cathode layer 31 in which the concentration distribution of the conductive auxiliary agent, the cathode active material and the solid electrolyte changes in the thickness direction of the cathode layer 31 can be produced by laminating the plurality of cathode green sheets having different concentrations of the conductive auxiliary agent, the cathode active material and the solid electrolyte. In addition, the anode layer 32 in which the concentration distribution of the conductive auxiliary agent, the anode active material and the solid electrolyte changes in the thickness direction of the anode layer 32 can be produced by laminating the plurality of anode green sheets having different concentrations of the conductive auxiliary agent, the anode active material and the solid electrolyte.

(B) Method of Producing Battery by Coating Method (Step of Producing First Laminate)

The cathode layer 31 in which the concentration distribution of the conductive auxiliary agent changes in the thickness direction of the cathode layer 31 is produced as follows. First, a plurality of cathode pastes having different concentrations of conductive auxiliary agents are prepared. Next, these cathode pastes are coated and dried repeatedly by the screen printing method or the like to laminate a plurality of thin films having different concentrations of conductive auxiliary agents, thereby producing the first laminate. In this case, the plurality of thin films are laminated so that the concentration of the conductive auxiliary agent of the thin film positioned inside the first laminate (for example, in the central part of the cathode layer 31 in the thickness direction of the cathode layer 31) is higher than the concentration of the conductive auxiliary agent of the thin film positioned on both main surfaces of the first laminate. Specifically, the plurality of thin films having different concentrations of the conductive auxiliary agents are laminated so that the concentration of the conductive auxiliary agent in the first laminate increases from both main surfaces of the first laminate toward the inside of the first laminate (for example, the central part of the cathode layer 31 in the thickness direction of the cathode layer 31).

(Step of Producing Second Laminate)

The anode layer 32 in which the concentration distribution of the conductive auxiliary agent changes in the thickness direction of the anode layer 32 is produced as follows. First, a plurality of anode pastes having different concentrations of conductive auxiliary agents are prepared. Next, these anode pastes are coated and dried repeatedly by the screen printing method or the like to laminate a plurality of thin films having different concentrations of conductive auxiliary agents, thereby producing the second laminate. In this case, the plurality of thin films are laminated so that the concentration of the conductive auxiliary agent of the thin film positioned inside the second laminate (for example, in the central part of the anode layer 32 in the thickness direction of the anode layer 32) is higher than the concentration of the conductive auxiliary agent of the thin film positioned on both main surfaces of the second laminate. Specifically, the plurality of thin films having different concentrations of conductive auxiliary agents are laminated so that the concentration of the conductive auxiliary agent in the second laminate increases from both main surfaces of the second laminate toward the inside of the second laminate (for example, the central part of the anode layer 32 in the thickness direction of the anode layer 32).

(Step of Producing Battery)

A battery is produced in the same manner as the "step of producing a battery" in the first embodiment except that the first laminate and the second laminate obtained as described above are used instead of the cathode green sheet and the anode green sheet. It is noted that before the step of producing a battery, the solid electrolyte contained in each thin film configuring the first and second laminates may be heated and sintered by burning (degreasing) the binder contained in each of the thin films configuring the first and second laminates and then firing the first and second laminates.

The cathode layer 31 in which the concentration distribution of the conductive auxiliary agent, the cathode active material and the solid electrolyte changes in the thickness direction of the cathode layer 31 can be produced by coating, drying, and laminating the plurality of thin films having different concentrations of the conductive auxiliary agent, the cathode active material and the solid electrolyte. In addition, the anode layer 32 in which the concentration distribution of the conductive auxiliary agent, the anode active material and the solid electrolyte changes in the thickness direction of the anode layer 32 can be produced by coating, drying, and laminating the plurality of thin films having different concentrations of the conductive auxiliary agent, the anode active material and the solid electrolyte.

[Effect]

In the battery according to the second embodiment, the concentration of the conductive auxiliary agent in the cathode layer 31 is higher than the concentration of the conductive auxiliary agent on the main surface of the cathode layer 31, and the concentration of the conductive auxiliary agent in the anode layer 32 is higher than the concentration of the conductive auxiliary agent on the main surface of the anode layer 32. As a result, the internal resistances of the cathode layer 31 and the anode layer 32 can be reduced, which enables rapid charging and discharging.

In addition, in the battery according to the second embodiment, the cathode layer 31 and the anode layer 32 do not include the current collecting layer, so the configuration of the battery can be simplified. Therefore, the step of producing the battery can be simplified.

In addition, in the battery according to the second embodiment, when the concentration of the cathode active material on both main surfaces of the cathode layer 31 is higher than the concentration of the cathode active material in the cathode layer 31, and the concentration of the anode active material on both main surfaces of the anode layer 32 is higher than the concentration of the anode active material in the anode layer 32, the following effects can be obtained. That is, the capacitance of the battery can be improved by reducing the unused cathode active material and anode active material.

[Modified Example]

In the second embodiment, a configuration is described in which both of the cathode layer 31 and the anode layer 32 each have a concentration distribution that changes in the thickness direction is described, but one of the cathode layer 31 and the anode layer 32 may have a concentration distribution that changes in the thickness direction.

In the second embodiment, the case where the present technology is applied to the battery in which both the cathode layer 31 and the anode layer 32 do not include the current collecting layer has been described, but the present technology may be applied to the battery in which one of the cathode layer 31 and the anode layer 32 includes the current collecting layer. However, it is effective to apply the present technology to the battery having the configuration in which the electrode does not have the current collecting layer, and it is particularly effective to the present technology to the battery in which the electrode includes the active material having no conductivity and does not have the current collecting layer.

<3 Third Embodiment>

[Configuration of Battery]

(Average Aspect Ratio of Anode Active Material)

In the battery according to the third embodiment, the average aspect ratio of the anode active material (grains) contained in the anode layer 22 is 2 or more and 10 or less, preferably 4 or more and 10 or less, more preferably 6 or more and 10 or less, still more preferably 7 or more and 10 or less, and particularly preferably 8 or more and 10 or less. When the average aspect ratio is 2 or more, the following effects can be obtained. (1) The interfacial bonding of the anode active material (grains)/solid electrolyte in the anode layer 22 is good, and the cycle characteristics are improved. (2) The voids in the anode layer 22 are reduced, and the anode layer 22 having a high relative density can be obtained. (3) The electron path of the anode layer 22 can be formed well. (4) The smoothness of the anode material can be improved. On the other hand, when the aspect ratio is 10 or less, the internal short circuit by contact with the cathode layer 31 can be suppressed.

(Method of Measuring Aspect Ratio of Anode Active Material)

Figure 11:
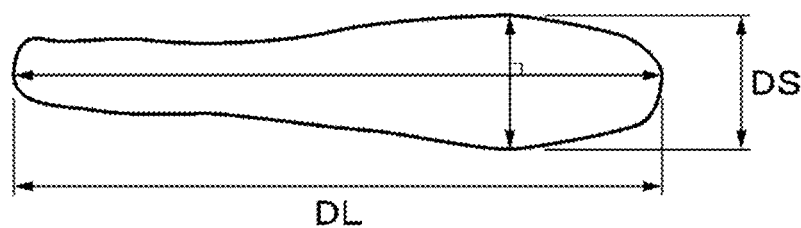
FIG. 11 is a schematic diagram for describing a method of calculating an aspect ratio of an anode active material.

The average aspect ratio of the anode active material is measured as follows. First, the battery is cut in the direction perpendicular to its main surface, and then the cross section of the battery is polished by ion milling. Next, the cross section of the anode layer 22 is shot by SEM, 10 anode active material grains are randomly selected from the shot cross-sectional SEM image, and major axis lengths DL and minor axis lengths DS of each anode active material grain are measured using a scale (see FIG. 11). Here, the major axis length DL means the largest one of the distances between two parallel lines drawn from all angles (i.e., so-called maximum Feret diameter) so as to be in contact with the contour of the anode active material grains. On the other hand, the minor axis length DS means the largest one of the lengths of the anode active material grains in the direction orthogonal to the major axis of the anode active material grains.

Subsequently, the major axis lengths DL of the 10 anode active material grains measured are simply averaged (e.g., arithmetic average) to obtain the average major axis length DLave, and the minor axis lengths DS of the 10 anode active material grains measured are simply averaged (e.g. arithmetic average) to obtain an average minor axis length DSave. Thus, the average aspect ratio (e.g., DLave/DSave) of the anode active material is obtained from the average major axis length DLave and the average minor axis length DSave.

(Anode Active Material Layer)

The anode active material preferably contains graphite. The graphite preferably contains at least one of natural graphite, artificial graphite and graphitized mesocarbon microbeads. The surface of the anode active material (grains) in the anode layer 22 is covered with the solid electrolyte. From the viewpoint of improving the cycle characteristics and the like, it is preferable that voids are not present or are little present at the interface between the anode active material (grains) and the solid electrolyte.

(Porosity of Anode Layer)

From the viewpoint of improving the cycle capacitance retention rate, the porosity in the cross section of the anode layer 22 is preferably 20% or less, more preferably 15% or less, still more preferably 10% or less, and particularly preferably 5% or less.

(Method of Measuring Porosity of Anode Layer)

The porosity of the anode layer 22 is measured as follows. First, the battery is cut in the direction perpendicular to its main surface, and then the cross section of the battery is polished by ion milling. Next, the cross section of the anode layer 22 is shot by the SEM such that the field of view is greater than 200 μm×200 μm. Subsequently, a total area of the voids present in the cross section of the anode layer 22 and an area (area of the cross section of the anode layer 22 in a range where the total area of the voids is measured) of a cross section of the anode layer 22 are measured from a cross-sectional SEM image by the image analysis software (analySIS pro manufactured by Soft Imaging System GmbH). Finally, the porosity of the anode layer 22 is obtained from the following Equation using the above measured values.

(Porosity of anode layer 22)[%]=(total area of voids present in cross section of anode layer 22)/(area of cross section of anode layer 22)

(Area Occupied by Anode Active Material and Solid Electrolyte)

It is preferable that the area occupied by the anode active material in the cross section of the anode layer 22 is equal to or larger than the area occupied by the solid electrolyte in the cross section of the anode layer 22. Thereby, the electronic path can be formed well.

(Method of Measuring Area Occupied by Anode Active Material and Solid Electrolyte)

The occupied area ratio of the anode active material and the solid electrolyte material is measured as follows. First, the cross section of the anode layer 22 is shot in the same manner as in the "method of measuring a porosity of an anode layer". Subsequently, the area occupied by the anode active material and the solid electrolyte in the cross section of the anode layer 22 is measured by the cross-sectional SEM image by the image analysis software (analySIS pro manufactured by Soft Imaging System GmbH).

The third embodiment is the same as the first embodiment except for the above.

[Modified Example]

In the third embodiment, the configuration in which the average aspect ratio of the anode active material is 2 or more and 10 or less is described, but the average aspect ratio of the cathode active material may be 2 or more and 10 or less.

<4 Fourth Embodiment>

[Composition of Solid Electrolyte]

Figure 12A:
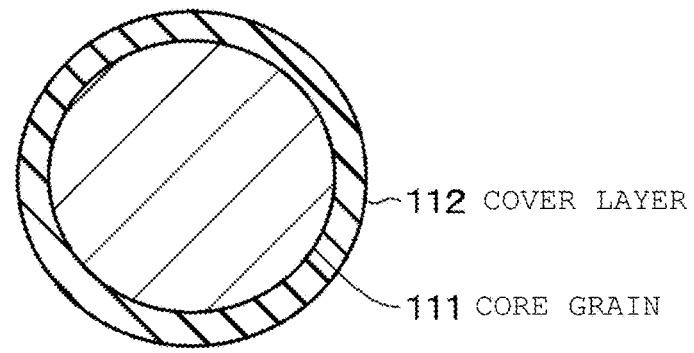
FIG. 12A is a cross-sectional view illustrating an example of a composition of a solid electrolyte according to a fourth embodiment.

A solid electrolyte according to the fourth embodiment includes a powder of surface-covered composite grains. As illustrated in FIG. 12A, the surface-covered composite grains include core grains 111 and a cover layer 112 provided on surfaces of the core grains 111.

The solid electrolyte according to the fourth embodiment is suitable for use in an electrochemical device. It should be appreciated that the electrochemical device can be basically any device, but is, for example, various batteries using lithium and the like, a capacitor, a gas sensor, a lithium ion filter, and the like. The battery is, for example, a primary battery, a secondary battery, an air battery, a fuel cell or the like. The secondary battery is, for example, an all-solid-state lithium ion secondary battery. In addition, the solid electrolyte according to the fourth embodiment can be used in any of the all-solid-state battery and the liquid battery. For purposes of this disclosure, a "liquid-based battery" refers to a liquid-based battery in which the solid electrolyte is used as part of the electrolyte contained in the battery.

(Core Grain)

Examples of the core grain 111 include, for example, a spherical shape, an oval shape, a needle shape, a plate shape, a scaly shape, a tube shape, a wire shape, a bar shape (rod shape), and an irregular shape or the like, but are not particularly limited thereto. Note that two or more grains having the above-mentioned shapes may be combined. Here, examples of the spherical shape include not only a truly spherical shape but also a shape in which the truly spherical shape is slightly flat or distorted, a shape in which irregularities are formed on a surface of the truly spherical shape, or a shape in which these shapes are combined, or the like. Examples of the oval shape includes not only a strictly spherical shape but also a shape in which the strictly spherical shape is slightly flat or distorted, a shape in which irregularities are formed on a surface of the strictly spherical shape, a shape in which these shapes are combined, or the like.

The core grain 111 contains a crystalline solid electrolyte. Here, the crystalline solid electrolyte refers to a crystallographically single crystal or polycrystal, whose peak is observed in X-ray diffraction or electron beam diffraction.

The crystalline solid electrolyte contains at least one of oxide, nitride and halide. Specifically, the crystalline solid electrolyte includes at least one of an oxide-based solid electrolyte, a nitride-based solid electrolyte, and a halide-based solid electrolyte. The oxide-based solid electrolyte contains, for example, at least one of $Li_6La_2BaTa_2O_{12}$, $Li_7La_3Zr_2O_{12}$, $Li_{6.75}La_3Zr_{1.75}Nb_{0.25}O_{12}$, $Li_6BaLa_2Ta_2O_{12}$, $Li_{1+x}Al_xTi_{2-x}(PO_4)_3$, $La_{2/3-x}Li_{3x}TiO_3$ or the like.

The core grain 111 may contain a Li-rich crystalline solid electrolyte. Here, the Li-rich crystalline solid electrolyte refers to one in which the content of Li in the core grain 111 is 20 atomic % or more. It is preferable that the upper limit of the content of Li in the core grain 111 is 80 atomic % or less, but is not limited particularly to this value.

(Cover Layer)

The cover layer 112 has a function as a binder. Specifically, the cover layer 112 has a function of binding between coated composite grains and between the coated composite grains and the active material grains by firing.

The cover layer 112 covers at least a part of the surface of the core grain 111. Specifically, the cover layer 112 may partially cover the surface of the core grain 111 or may cover the entire surface of the core grain 111, but from the viewpoint of the reduction in the interface resistance between the coated composite grains and the interface resistance between the coated composite grains and the active material grains and the like, it is preferable that the entire surface of the core grain 111 is coated. At the interface between the core grain 111 and the cover layer 112, the composition, state or the like of both of the core grain 111 and the cover layer 112 may be changed discontinuously or continuously.

The cover layer 112 contains a glass-based solid electrolyte. Here, the glass-based solid electrolyte refers to crystallographically amorphous materials, such as halo, observed by X-ray diffraction, electron beam diffraction and the like.

The glass-based solid electrolyte contains, for example, oxide glass. As the oxide glass, the same one as the solid electrolyte contained in the solid electrolyte layer 23 of the first embodiment can be exemplified.

The cover layer 112 may be formed of small grains containing a glass-based solid electrolyte. The size of the small grain is smaller than the size of the core grain 111. Here, the grain size means the largest one of the distances between two parallel lines drawn from all angles (i.e., so-called maximum Feret diameter) so as to be in contact with the contour of the grains.

(Ion Conductivity and Sintering Temperature)

The lithium ion conductivity of the crystalline solid electrolyte contained in the core grain 111 is higher than the lithium ion conductivity of the glass-based solid electrolyte contained in the cover layer 112. In addition, a softening point of the crystalline solid electrolyte contained in the core grain 111 is higher than a softening point of the glass-based solid electrolyte contained in the cover layer 112.

A sintering temperature of the crystalline solid electrolyte contained in the core grain 111 is higher than a sintering temperature of the glass-based solid electrolyte contained in the cover layer 112. The sintering temperature of the crystalline solid electrolyte contained in the core grain 111 is preferably more than 550° C. and 1100° C. or lower, preferably 600° C. or higher and 1100° C. or lower, and more preferably 700° C. or higher and 1100° C. or lower.

The sintering temperature of the glass-based solid electrolyte contained in the cover layer 112 is preferably 550° C. or lower, more preferably 300° C. or higher and 550° C. or lower, and still more preferably 300° C. or higher and 500° C. or lower. In addition, when the sintering temperature is 550° C. or lower, the glass-based solid electrolyte reacts with the electrode active material in the firing step (e.g., sintering step) to be able to suppress byproducts such as a nonconductor from being formed. Therefore, the deterioration in the battery characteristics can be suppressed. In addition, since a selection range of the type of electrode active materials is expanded, the degree of freedom in battery design can be improved. When the sintering temperature is 500° C. or lower, the carbon material can be used as the anode active material. Therefore, the energy density of the battery can be improved. In addition, the carbon material can be used as the conductive agent, so a favorable electron conduction path can be formed in the electrode layer or the electrode active material layer, and the conductivity of the electrode layer or the electrode active material layer can be improved. On the other hand, when the sintering temperature is 300° C. or higher, the binder such as an acrylic resin contained in the electrode layer precursor, the electrode active material layer precursor, or the solid electrolyte layer precursor can be burned down in the firing step (sintering step).

[Action of Solid Electrolyte]

When the solid electrolyte having the above composition is fired, the glass-based solid electrolyte contained in the cover layer 112 is softened, and adjacent composite grains are bound (e.g., sintered). Thereby, the interface resistance between composite grains can be reduced. In addition, when the composite grains and the electrode active material grains are adjacent to each other, the composite grains and the electrode active material grains are bound (e.g., sintered). Thereby, the interface resistance between the composite grains and the electrode active material grains can be reduced.

[Effect]

The solid electrolyte according to the fourth embodiment includes a powder of surface-covered composite grains. The composite grain includes the core grain 111 including the crystalline solid electrolyte, and the cover layer 112 which includes the glass-based solid electrolyte and covers at least a part of the surface of the core grain 111. When the battery is produced using the solid electrolyte having such a configuration, high ion conductivity which is a feature of the crystalline solid electrolyte can be sufficiently obtained. In addition, the core grain 111 can be provided with binding properties by the glass-based solid electrolyte contained in the cover layer 112, and the interface resistance between the composite grains and between the composite grains and the active material grains can be reduced.

Figure 12B:
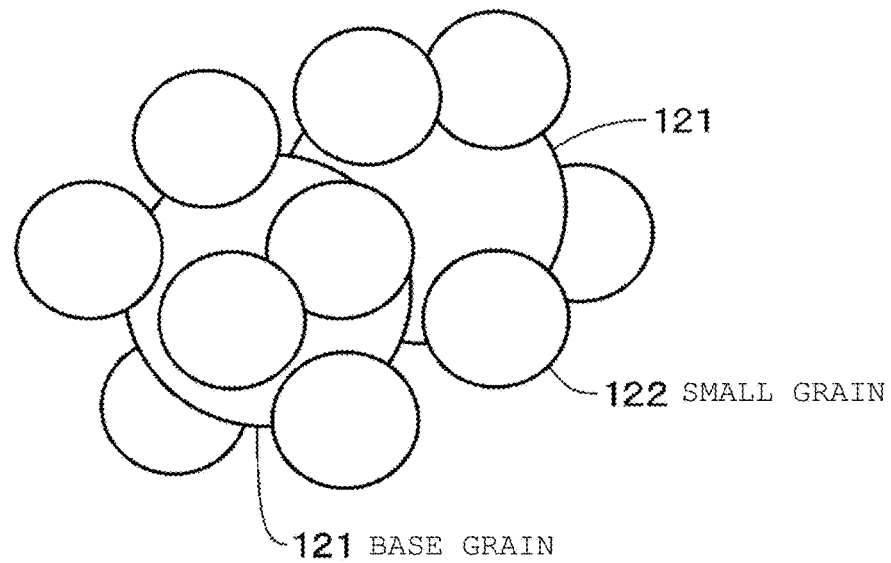
FIG. 12B is a schematic diagram illustrating an example of the composition of the solid electrolyte containing a mixed powder of base grains and small grains.

On the other hand, as illustrated in FIG. 12B, when the battery is produced using the solid electrolyte containing a mixed powder of base grains 121 containing the crystalline solid electrolyte with small grains 122 containing the glass-based solid electrolyte, the high ion conductivity which is a feature of the crystalline solid electrolyte cannot be sufficiently obtained.

For example, the mixed powder of the base grains 121 containing the Li-rich crystalline solid electrolyte and the small grains 122 containing the glass-based solid electrolyte, the core grains 111 containing the Li-rich crystalline solid electrolyte, and the powder of the coated composite grains including the cover layer 112 provided on the surface of the core grains 111 have the relationship of the ion conductivity shown below.

(Ion conductivity of mixed powder)<(Ion conductivity of powder of composite grains)

In addition, the mixed powder of the base grains 121 containing $Li_6N_2BaTa_2O_{12}$ as the crystalline solid electrolyte and the small grains 122 containing the glass-based solid electrolyte, the core grains 111 containing $Li_6La_2BaTa_2O_{12}$ as the crystalline solid electrolyte, and the powder of the coated composite grains containing the cover layer 112 provided on the surface of the core grains 111 have the relationship of the ion conductivity shown below.

(Ion conductivity of mixed powder)<(Ion conductivity of powder of composite grains)

[Modified Example]

The solid electrolyte may further include a powder of non-surface-covered grains (that is, a powder of grains without the cover layer) as needed, in addition to the powder of the surface-covered composite grains. The non-surface-covered grains preferably contain the glass-based solid electrolyte. As the glass-based solid electrolyte, the same one as the solid electrolyte contained in the solid electrolyte layer 23 of the first embodiment can be exemplified.

<5 Fifth Embodiment>

[Configuration of Battery]

A battery according to the fifth embodiment differs from the battery according to the first embodiment in that the cathode layer 21, the anode layer 22, and the solid electrolyte layer 23 contain the solid electrolyte according to the fourth embodiment.

In the cathode layer 21, composite grains are bound to each other through the cover layer 112, and the composite grains and cathode active material grains are interposed through the cover layer 112. In addition, in the anode layer 22, the composite grains are bound to each other through the cover layer 112, and the composite grains and the cathode active material grains are bound to each other through the cover layer 112. Further, in the solid electrolyte layer 23, the composite grains are bonded to each other through the cover layer 112.

[Effect]

In the battery according to the fifth embodiment, the cathode layer 21, the anode layer 22, and the solid electrolyte layer 23 contain the solid electrolyte according to the fourth embodiment. Thereby, the cathode layer 21 which has high ion conductivity, the anode layer 22, and the solid electrolyte layer 23 are obtained. In addition, the interfacial resistance between the composite grains, between the composite grains and the cathode active material grains, and between the composite grains and the anode active material grains can be reduced.

[Modified Example]

At least one of the cathode layer 21, the anode layer 22, and the solid electrolyte layer 23 may include the solid electrolyte according to the fourth embodiment. From the viewpoint of improving battery characteristics, at least two layers of the cathode layer 21, the anode layer 22, and the solid electrolyte layer 23 preferably include the solid electrolyte according to the fourth embodiment, and three layers of the cathode layer 21, the anode layer 22, and the solid electrolyte layer 23 more preferably contain the solid electrolyte according to the fourth embodiment.

<6 Example>

Hereinafter, the present technology will be specifically described with reference to Examples, but it should be appreciated that it is not limited to only these Examples.

Examples, Comparative Examples, and Reference Examples will be described in the following order.

i Examples and Comparative Examples in which the surface roughness Rz1 and Rz2 of the cathode layer and the anode layer, the porosity of the solid electrolyte layer, and the thickness of the solid electrolyte layer are changed ii Reference examples in which the average aspect ratio of the anode active material is changed <i Examples and Comparative Examples in which Surface Roughness Rz1 and Rz2 of Cathode Layer and Anode Layer, Porosity of Solid Electrolyte Layer, and Thickness of Solid Electrolyte Layer were Changed>

In the following Examples 1 to 9 and Comparative Examples 1 to 3, the surface roughness Rz1 and Rz2 of the cathode layer and the anode layer, the porosity of the solid electrolyte layer, and the thickness of the solid electrolyte layer are each obtained by "the method of measuring surface roughness Rz1 and Rz2 of a cathode layer and an anode layer", "the method of measuring a porosity of a solid electrolyte layer", and "the method of measuring a thickness of a solid electrolyte layer" which are described in the first embodiment.

[Examples 1 to 8 and Comparative Examples 1 to 3]

(Step of Producing Electrolyte Green Sheet)

First, oxide glass ($Li_2O:SiO_2:B_2O_3=54:11:35$ (mol % ratio)) as a solid electrolyte and an acrylic binder were mixed. Next, this mixture was mixed with butyl acetate so that a solid content was 35% by mass and was stirred for 14 hours together with a zirconia ball of 10 mmφ, thereby obtaining an electrolyte paste. Subsequently, this electrolyte paste was coated onto a release film and dried at 80° C. for 10 minutes to produce an electrolyte green sheet as a solid electrolyte layer precursor. Then, the electrolyte green sheet was punched into a disk shape together with the release film.

(Step of Producing Cathode Green Sheet)

First, lithium cobaltate (manufactured by Aldrich) as the cathode active material and oxide glass ($Li_2O:SiO_2:B_2O_3=54:11:35$ (mol % ratio)) as a solid electrolyte were mixed in a mass ratio of lithium cobaltate:oxide glass=90:10. Next, this mixture and an acrylic binder were mixed in a mass ratio of mixture (lithium cobaltate+oxide glass):acrylic binder=87:13. Next, this mixture was mixed with butyl acetate so that a solid content was 30% by mass and was stirred for 14 hours together with a zirconia ball of 10 mmφ, thereby obtaining a cathode paste. Subsequently, this cathode paste was coated onto the release film and dried at 80° C. for 10 minutes to produce a cathode green sheet as a cathode layer precursor. { } Then, the cathode green sheet was punched into a disk shape together with the release film.

(Step of Producing Anode Green Sheet)

First, natural graphite powder as the cathode active material and oxide glass ($Li_2O:SiO_2:B_2O_3=54:11:35$ (mol % ratio)) as the solid electrolyte were mixed in a mass ratio of spherical natural graphite powder:oxide glass=90:10. Next, this mixture and an acrylic binder were mixed in a mass ratio of mixture (spherical natural graphite powder+oxide glass):acrylic binder=83:17. Next, this mixture was mixed with butyl acetate so that a solid content was 30% by mass and was stirred for 14 hours together with a zirconia ball of 10 mmφ, thereby obtaining an anode paste. Subsequently, this anode paste was coated onto the release film and dried at 80° C. for 10 minutes to produce an anode green sheet as an anode layer precursor. Next, the anode green sheet was punched into a disk shape together with the release film.

(Step of Producing Battery)

First, the cathode green sheet, the anode green sheet, and the electrolyte green sheet obtained as described above are each peeled off from the release film, and an anode green sheet, an electrolyte green sheet, and a cathode green sheet are laminated on a disk-shaped SUS plate in this order to obtain a laminate, and then the laminate is pressure-bonded by cold isostatic press (i.e., CIP). Next, the laminate is heated at 315° C. for 10 hours to remove the acrylic binder contained in each green sheet of the laminate, and then pressure-sintered at 400° C. for 10 minutes for each green sheet of the laminate to change the oxide glass contained in each green sheet of the laminate to the oxide glass ceramics (i.e., a mixture of the oxide glass and the oxide crystal). Thus, the targeted coin type all-solid-state battery (i.e., all solid lithium ion secondary battery) was produced.

However, in order to obtain surface roughness Rz1 and Rz2 of the cathode layer and the anode layer shown in Table 1 and the porosity of the solid electrolyte, in the above production step, a blending ratio of the solid electrolyte (e.g., oxide glass) and the binder (e.g., acrylic binder), the grain sizes of the cathode and anode active materials, the viscosities of the cathode and anode pastes, and the pressure (e.g., pressing pressure) at the time of pressure sintering were adjusted as shown in Table 2. Here, the grain sizes of the cathode and anode active materials have an average grain size D50, and were obtained from a grain size distribution measured by a grain size distribution analyzer (e.g., MT3300EXII-SDC manufactured by Microtrac). In addition, the coated thickness of the electrolyte paste was adjusted so that the thickness of the solid electrolyte layer shown in Table 1 is obtained.

It is noted that the porosity of the solid electrolyte layer is reduced as the amount of binder contained in the electrolyte paste is reduced. In addition, as the grain sizes of the cathode and anode active materials are reduced, the surface roughness Rz1 and Rz2 of the surfaces of the cathode layer and the anode layer are reduced. In addition, as the viscosities of the cathode and anode active materials are reduced, the surface roughness Rz1 and Rz2 of the surfaces of the cathode layer and the anode layer are reduced. In addition, as the pressure at the time of the pressure sintering increases, the porosity is reduced, and the surface roughness Rz1 and Rz2 of the surfaces of the cathode layer and the anode layer are reduced.

[Example 9]

In the step of producing the battery, by performing the pressure sintering at 450° C. for 10 minutes, the oxide glass contained in each green sheet of the laminate was changed to an oxide crystal. In addition, in order to obtain the surface roughness Rz1 and Rz2 of the cathode layer and the anode layer shown in Table 1 and the porosity of the solid electrolyte, in the above production step, a blending ratio of the solid electrolyte (oxide glass) and the binder (acrylic binder), the grain sizes of the cathode and anode pastes, a leveling time of the cathode and anode pastes, and the pressure (pressing pressure) at the time of pressure sintering were adjusted as shown in Table 2. A coin-type all-solid-state battery was produced in the same manner as in Example 2 except for the descriptions above.

(Evaluation of Occurrence of Short Circuit)

The occurrence of the short circuit of the battery obtained as described above was evaluated as follows. First, the battery was charged to 4.2 V under the following charge conditions. At this time, when the charge voltage did not increase, it was determined that the effect of suppressing the occurrence of short circuit could not be obtained. Next, the battery was discharged to 3.82 V under the following discharge conditions.

Charge condition: CCCV (constant current/constant voltage) 4.2 V, 0.1 C/0.01 C cut, 23° C.

Discharge condition: CCCV 3.82 V, 0.1 C/0.01 C cut, 23° C.

Subsequently, an open circuit voltage (OCV) was measured, and a change amount of voltage per month ΔOCV/month was calculated. The occurrence of the short circuit was evaluated using the calculated amount of change in voltage.

Hereinafter, the evaluation criteria of the occurrence of the short circuit are shown.

In the case of ΔOCV/month≤0.1 V/month: The suppression effect of the occurrence of the short circuit is particularly good (in Table 1, symbol "⊚")

In the case of 0.1 V/month<ΔOCV/month: The suppression effect of the occurrence of the short circuit is good (in Table 1, symbol "○")

When the charge voltage does not increase during charging: The effect of suppressing the occurrence of the short circuit cannot be obtained (indicated by symbol "x" in Table 1)

Table 1 shows the configurations and evaluation results of the batteries of Examples 1 to 9 and Comparative Examples 1 to 3.

TABLE 1

|  | Porosity of solid electrolyte layer [%] | Rz1 [μm] | Rz2 [μm] | Rz1 + Rz2 [μm] | Thickness of solid electrolyte layer [μm] | Material of electrolyte | Occurrence of short circuit |
|---|---|---|---|---|---|---|---|
| Example 1 | 3 | 10 | 10 | 20 | 20 | Glass + crystal | ⊚ |
| Example 2 | 3 | 10 | 10 | 20 | 10 | Glass + crystal | ⊚ |
| Example 3 | 3 | 3 | 15 | 18 | 10 | Glass + crystal | ⊚ |
| Example 4 | 3 | 14 | 3 | 17 | 10 | Glass + crystal | ⊚ |
| Example 5 | 3 | 7 | 15 | 22 | 10 | Glass + crystal | ○ |
| Example 6 | 3 | 15 | 7 | 22 | 10 | Glass + crystal | ○ |
| Example 7 | 3 | 10 | 10 | 20 | 1 | Glass + crystal | ○ |
| Example 8 | 3 | 10 | 10 | 20 | 0.5 | Glass + crystal | ○ |
| Example 9 | 10 | 10 | 10 | 20 | 10 | Crystal | ○ |
| Comparative Example 1 | 12 | 12 | 12 | 24 | 10 | Glass + crystal | X |
| Comparative Example 2 | 3 | 18 | 10 | 28 | 10 | Glass + crystal | X |
| Comparative Example 3 | 3 | 10 | 19 | 29 | 10 | Glass + crystal | X |

Table 2 shows the production conditions of the batteries of Examples 1 to 9 and Comparative Examples 1 to 3.

TABLE 2

|  | Electrolyte paste | Anode paste | | Cathode paste | | Laminate |
|---|---|---|---|---|---|---|
|  | Solid electrolyte:binder (mass ratio) | Grain size of active material [μm] | Viscosity | Grain size of active material [μm] | Viscosity | Press pressure [Pa] |
| Example 1 | 84:16 | 3 | 20 | 3 | 20 | 30M |
| Example 2 | 84:16 | 3 | 20 | 3 | 20 | 30M |
| Example 3 | 84:16 | 3 | 5 | 7 | 20 | 30M |
| Example 4 | 84:16 | 8 | 20 | 3 | 5 | 30M |
| Example 5 | 84:16 | 3 | 10 | 7 | 20 | 30M |
| Example 6 | 84:16 | 8 | 20 | 3 | 10 | 30M |
| Example 7 | 84:16 | 3 | 20 | 3 | 20 | 30M |
| Example 8 | 84:16 | 3 | 20 | 3 | 20 | 30M |
| Example 9 | 75:25 | 3 | 20 | 3 | 20 | 30M |
| Comparative Example 1 | 65:35 | 8 | 20 | 7 | 10 | 30M |
| Comparative Example 2 | 84:16 | 10 | 30 | 3 | 20 | 30M |
| Comparative Example 3 | 84:16 | 3 | 20 | 10 | 30 | 30M |

From the comparison of the evaluation results of Examples 1 to 9 and Comparative Examples 1 to 3, the following can be understood.

In the battery (Examples 1 to 9) in which the porosity of the solid electrolyte layer is 10% or less, and the surface roughness Rz1 of the cathode layer and the surface roughness Rz2 of the anode layer satisfy the relationship of Rz1+Rz2≤25, the occurrence of the short circuit can be suppressed. On the other hand, in the battery (Comparative Example 1) in which the porosity of the solid electrolyte layer exceeds 10% and in the batteries (Comparative Examples 2 and 3) in which the Rz1 and Rz2 do not satisfy the relationship of Rz1+Rz2≤25, the occurrence of the short circuit cannot be suppressed.

In addition, comparing the evaluation results of Examples 2 to 6 in which the thickness of the solid electrolyte layer is the same value (10 μm), in the batteries (Examples 2 to 4) in which, Rz1 and Rz2 satisfy the relationship of Rz1+Rz2≤20, it can be seen that the effect of suppressing the occurrence of the short circuit can be particularly improved.

In addition, in Table 1, although the evaluation results of Examples 7 and 8 is described with the same (evaluation result "o"), the battery of Example 7 whose thickness of the solid electrolyte layer is 1 μm had the high effect of suppressing the occurrence of the short circuit compared with Example 8 whose thickness of the electrolyte layer is 0.5 μm. Therefore, from the viewpoint of improving the effect of suppressing the short circuit, the thickness of the solid electrolyte layer is preferably 1 μm or more.

<ii Reference Examples in which the Average Aspect Ratio of the Anode Active Material is Changed>

[Reference Examples 1 to 6]

(Step of Forming Electrolyte Green Sheet)

First, oxide glass ($Li_2O:SiO_2:B_2O_3$=54:11:35 (mol % ratio)) as a solid electrolyte and an acrylic binder were mixed in a mass ratio of oxide glass:acrylic binder=86:14. Next, this mixture was mixed with butyl acetate so that a solid content was 30% by mass and was stirred for 12 hours together with a zirconia ball of 10 mmφ, thereby obtaining an electrolyte paste. Subsequently, this electrolyte paste was coated onto a release film and dried at 80° C. for 10 minutes to produce an electrolyte green sheet as a solid electrolyte layer precursor. Then, the electrolyte green sheet was punched into a disk shape together with the release film.

(Step of Forming Anode Green Sheet)

First, lithium cobaltate (e.g., manufactured by Aldrich) as the cathode active material and oxide glass ($Li_2O:SiO_2:B_2O_3$=54:11:35 (mol % ratio)) as a solid electrolyte were mixed in a mass ratio of lithium cobaltate:oxide glass=87:13. Next, this mixture and an acrylic binder were mixed in a mass ratio of mixture (lithium cobaltate+oxide glass):acrylic binder=70:30. Next, this mixture was mixed with butyl acetate so that a solid content was 30% by mass and was stirred for 12 hours together with a zirconia ball of 5 mmφ, thereby obtaining an cathode paste. Therefore, this cathode paste was coated onto the release film and dried at 60° C. for 10 minutes to produce a cathode green sheet as a cathode layer precursor. Then, the cathode green sheet was punched into a disk shape together with the release film.

(Step of Forming Anode Green Sheet)

First, artificial graphite (KS6 manufactured by Imerys Co. Ltd.) as the anode active material and the oxide glass ($Li_2O:SiO_2:B_2O_3$=54:11:35 (mol % ratio)) as the solid electrolyte were mixed in a mass ratio of artificial graphite:oxide glass=83:17. Next, this mixture and the acrylic binder were mixed in a mass ratio of mixture (artificial graphite+oxide glass):acrylic binder=70:30. Next, this mixture was mixed with butyl acetate so that a solid content was 30% by mass and was stirred for 12 hours together with a zirconia ball of 5 mmφ, thereby obtaining an anode paste. This anode paste was coated onto the release film and dried at 60° C. for 10 minutes to produce an anode green sheet as an anode layer precursor. Then, the anode green sheet was punched into a disk shape together with the release film.

(Step of Producing Battery)

First, the cathode green sheet, the anode green sheet, and the electrolyte green sheet obtained as described above were each peeled off from the release film, and the cathode green sheet, the electrolyte green sheet, and the anode green sheet were laminated on the Ni plate in this order and thermo-compression-bonded at 100° C. for 10 minutes. Thereby, the laminate was obtained Next, the laminate was heated at 300° C. for 10 hours to remove the acrylic binder, and then pressure-sintered at 400° C. for 30 minutes. The pressure at this time was about 3 kN/cm². Thereby, the targeted coin type all-solid-state battery was produced.

[Evaluation]

For the batteries of Reference Examples 1 to 6 obtained as described above, the average aspect ratio of the anode active material (artificial graphite), the porosity of the anode layer, and the discharge capacitance retention rate were evaluated as follows.

(Average Aspect Ratio)

The average aspect ratio of the anode active material was measured by the "method of measuring an average aspect ratio of an anode active material" described in the first embodiment.

(Porosity)

Figure 13:
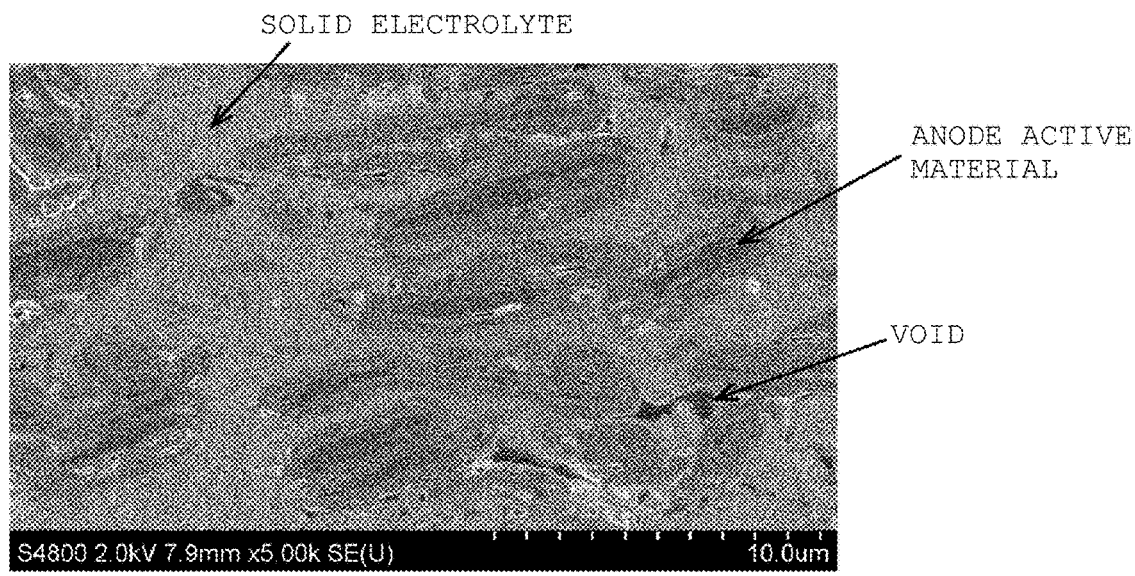
FIG. 13 is a diagram illustrating a cross-sectional SEM image of an anode layer according to Reference Example 2.

The porosity of the anode layer was measured by the "method of measuring a porosity of an anode layer" described in the first embodiment. FIG. 13 illustrates the cross-sectional SEM image of the anode layer of Reference Example 2. The average aspect ratio obtained from the image processing of the cross-sectional SEM image was 7.8, and the porosity was 4.6%.

(Discharge Capacitance Retention Rate)

First, with respect to the battery, a gold-plated battery evaluation jig was electrically joined to the Ni plate (cathode side) and the anode layer. Next, the charge and discharge were performed under the following charge and discharge conditions, and the discharge capacitance retention rate after 50 cycles [%](=((50th cycle discharge capacitance)/(first cycle discharge capacitance))×100) was calculated.

Measurement environment condition: Dry air atmosphere, 23° C.

Charge condition: CCCV (constant current/constant voltage) 4.2 V, 0.1 C/0.01 C cut, 23° C.

Discharge conditions: CC 2 V, 0.1 C cut, 23° C.

Figure 14:
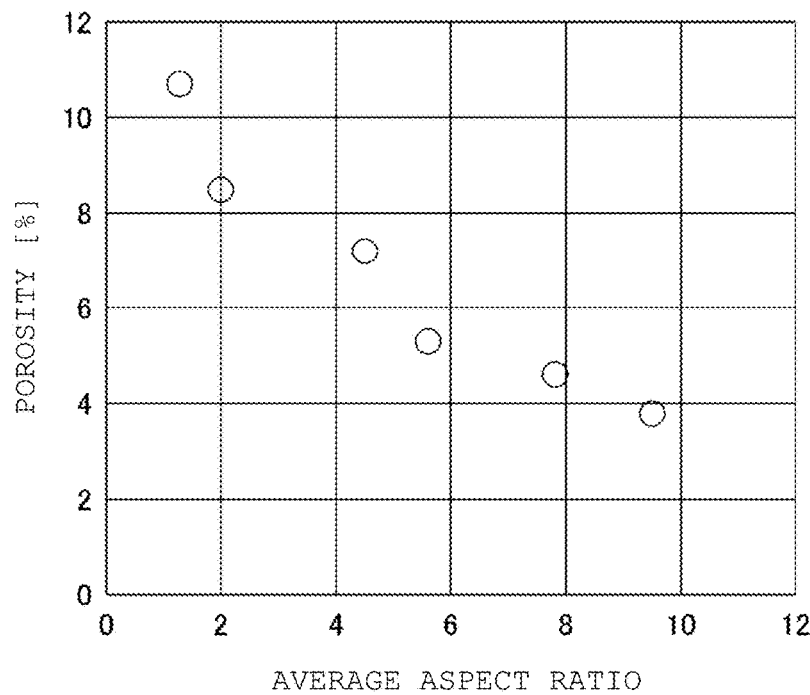
FIG. 14 is a graph illustrating the relationship between an average aspect ratio of the anode active material and a porosity of the anode layer.

Table 3 shows the relationship between the average aspect ratio of the anode active material, the porosity of the anode layer, and the capacitance retention rate after 50 cycles. FIG. 14 illustrates the relationship between the average aspect ratio of the anode active material and the porosity of the anode layer.

TABLE 3

|  | Average aspect ratio of anode active material | Porosity [%] | Discharge capacitance retention rate after 50 cycles [%] |
| --- | --- | --- | --- |
| Reference 1 | 9.5 | 3.8 | 89.5 |
| Reference 2 | 7.8 | 4.6 | 85.4 |

TABLE 3-continued

|  | Average aspect ratio of anode active material | Porosity [%] | Discharge capacitance retention rate after 50 cycles [%] |
|---|---|---|---|
| Reference 3 | 5.6 | 5.3 | 73.5 |
| Reference 4 | 4.5 | 7.2 | 50.3 |
| Reference 5 | 2 | 8.5 | 45.9 |
| Reference 6 | 1.3 | 10.7 | 38.5 |

The following can be seen from Table 3 and FIG. 14. When the average aspect ratio of the anode active material is 2 or more, the porosity in the anode layer can be reduced, and the good cycle capacitance retention rate can be obtained. When the average aspect ratio is 9.5 (Reference Example 1), the porosity of the anode layer is the smallest as 3.8%, and the cycle retention rate is the best.

<7 Application Example>

"Printed Circuit Board as Exemplary Embodiment"

Hereinafter, an exemplary embodiment in which the present disclosure is applied to a printed circuit board will be described.

The above-described battery can be mounted on the printed circuit board together with a charging circuit and the like. For example, electronic circuits such as an all-solid-state battery and a charging circuit can be mounted on a printed circuit board by a reflow process. The printed circuit board is an example of a battery module and may be a portable card type mobile battery.

Figure 15:
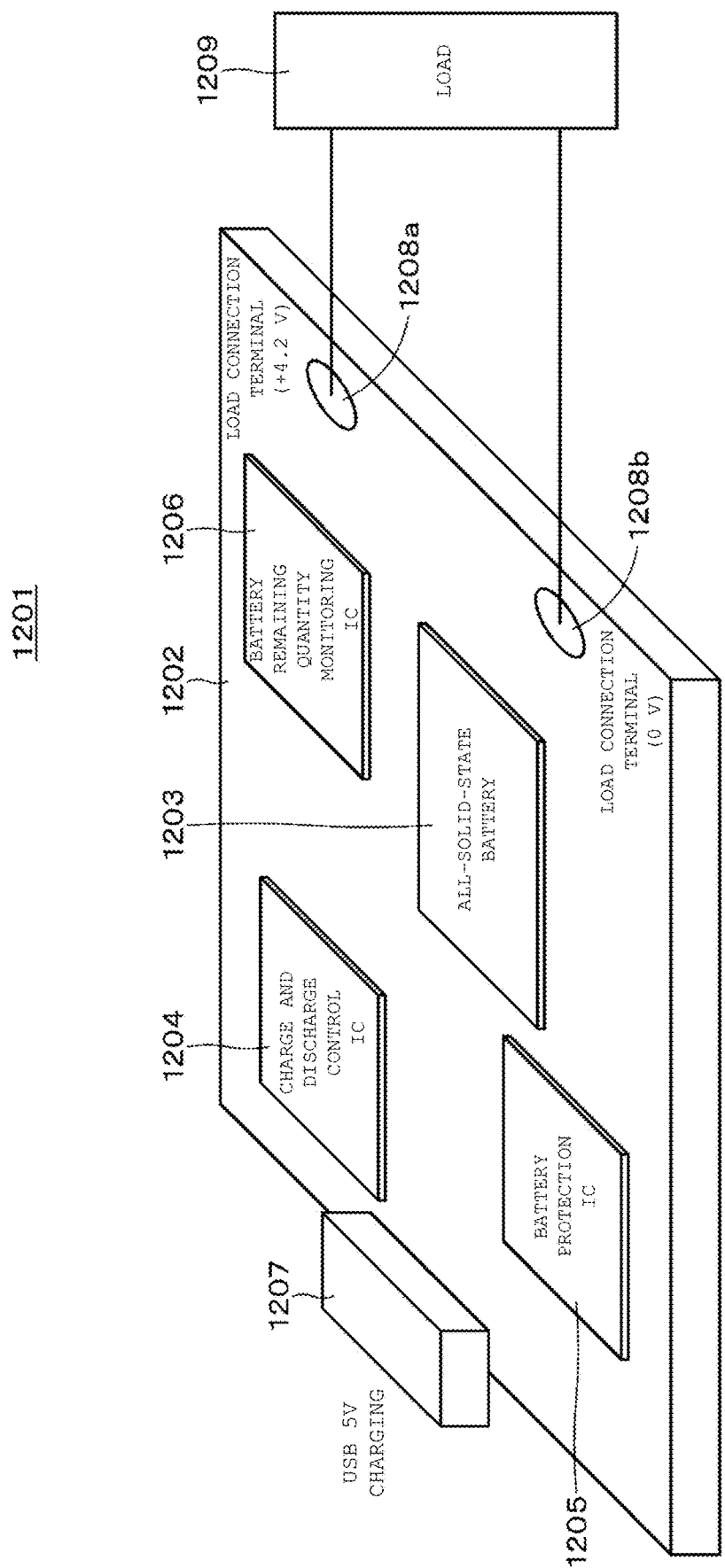
FIG. 15 is a perspective view illustrating an example of a configuration of a printed circuit board as an exemplary embodiment.

FIG. 15 illustrates an example of a configuration of a printed circuit board 1201. The printed circuit board 1201 includes a substrate 1202, an all-solid-state battery 1203 provided on one side of the substrate 1202, a charge and discharge control integrated circuit (IC) 1204, a battery protection IC 1205, a battery remaining quantity monitoring IC 1206, and a universal serial bus ("USB") interface 1207. Here, although an example in which the printed circuit board 1201 is a single-sided board will be described, the printed circuit board 1201 may be a double-sided board. Further, the printed circuit board 1201 may be a multilayer substrate or a buildup substrate.

The substrate 1202 is, for example, a rigid substrate. The all-solid-state battery 1203 is a battery according to any one of the first to third embodiments and the fifth embodiment and the modified examples thereof. The charge and discharge control IC 1204 is a control unit which controls a charge and discharge operation of the all-solid-state battery 1203. The battery protection IC 1205 is a control unit that controls the charge and discharge operation to prevent a charge voltage from being excessive during charging and discharging, or an overcurrent from flowing or an overdischarge from occurring due to a load short circuit. The battery remaining quantity monitoring IC 1206 is a monitoring unit which monitors the battery remaining amount of the all-solid-state battery 1203 and notifies a load (for example, host device) 1209 and the like of the battery remaining amount.

The all-solid-state battery 1203 is charged by power supplied from an external power supply or the like via the USB interface 1207. A predetermined power (for example, a voltage of 4.2 V) is supplied from the all-solid-state battery 1203 to the load 1209 via load connection terminals 1208a and 1208b. Note that the USB interface 1207 may be used for connection to the load.

Specific examples of the load 1209 include wearable devices (sports watch, watch, hearing aid, and the like), IoT terminals (sensor network terminal and the like), amusement devices (portable game terminal, game controller), IC board embedded batteries (real time clock IC), environmental power generation devices (storage element for power generation elements such as photovoltaic power generation, thermoelectric power generation, and vibration power generation) and the like.

"Universal Credit Card as Exemplary Embodiment"

Hereinafter, an exemplary embodiment in which the present disclosure is applied to a universal credit card will be described.

The universal credit card is a card in which functions such as a plurality of credit cards or point cards are integrated into one card. In this card, for example, information such as numbers and expiration dates of various credit cards and point cards can be incorporated, if a user puts the one universal credit card in his/her wallet, the user can choose and use cards whenever and whatever the user wants.

Figure 16:
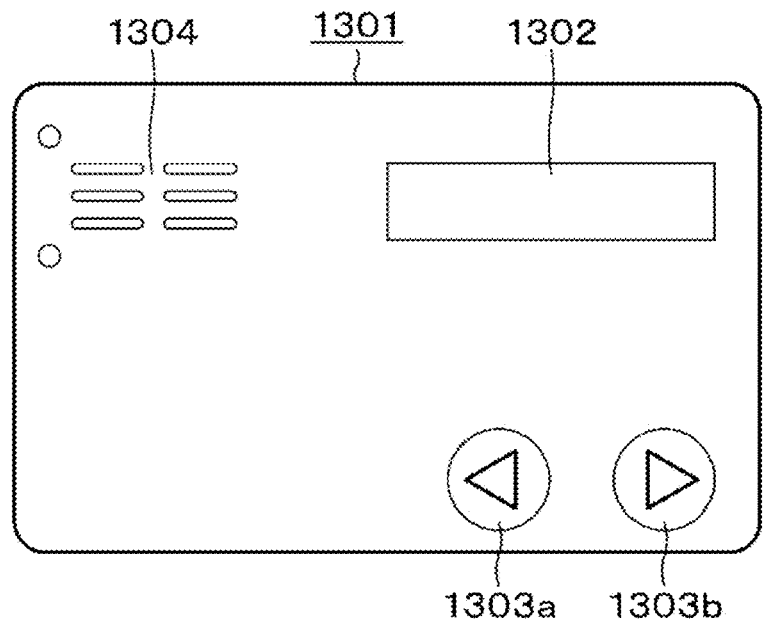
FIG. 16 is a plan view illustrating an example of an appearance of a universal credit card as an exemplary embodiment.

FIG. 16 illustrates an example of a configuration of a universal credit card 1301. The universal credit card 1301 has a card type shape and includes an IC chip and an all-solid-state battery (not illustrated) provided therein. In addition, the universal credit card 1301 has a low-power-consumption display 1302 mounted on one surface thereof, direction keys 1303a and 1303b as an operation unit, and a charging terminal 1304. The all-solid-state battery is a battery according to any one of the first to third embodiments and the fifth embodiment and the modified examples thereof.

For example, the user can operate the direction keys 1303a and 1303b while looking at the display 1302 to designate a desired one of a plurality of credit cards loaded on the universal credit card 1301 in advance. The designated credit card can be used in the same manner as a conventional credit card. The above is an example, and it goes without saying that the battery according to any of the first to third embodiments and the fifth embodiment and the modified examples thereof can be applied to all electronic cards other than the universal credit card 1301.

"Sensor Network Terminal as Exemplary Embodiment"

Hereinafter, an exemplary embodiment in which the present disclosure is applied to a sensor network terminal will be described.

A wireless terminal in a wireless sensor network is called a sensor node, and is configured to include one or more wireless chips, a microprocessor, a power supply (e.g., battery), and the like. A specific example of the sensor network is used to monitor energy saving management, health management, industrial measurement, traffic conditions, agriculture and the like. As a type of sensors, voltage, temperature, gas, illuminance or the like is used.

In the case of the energy saving management, as a sensor node, a power monitor node, a temperature/humidity node, an illuminance node, a $CO_2$ node, a human touch node, a remote control node, a router (e.g., repeater) and the like are used. These sensor nodes are provided to configure a wireless network in homes, office buildings, factories, shops, amusement facilities, and the like.

Then, data such as temperature, humidity, illuminance, $CO_2$ concentration, and electric energy are displayed, and the conditions of energy saving of the environment can be seen. Furthermore, on/off control for lighting, air conditioning facilities, ventilation facilities and the like is performed by a command from a control station.

ZigBee® can be used as one of wireless interfaces of the sensor network. The wireless interface is one of short distance wireless communication standards, and has characteristics that it has a short transferable distance and a low transfer rate but is inexpensive and consumes low power. Therefore, it is suitable for mounting on a battery-driven device. A basic part of the communication standards is standardized as IEEE 802.15.4. Communication protocols between devices above a logical layer are being formulated by the ZigBee® Alliance.

Figure 17:
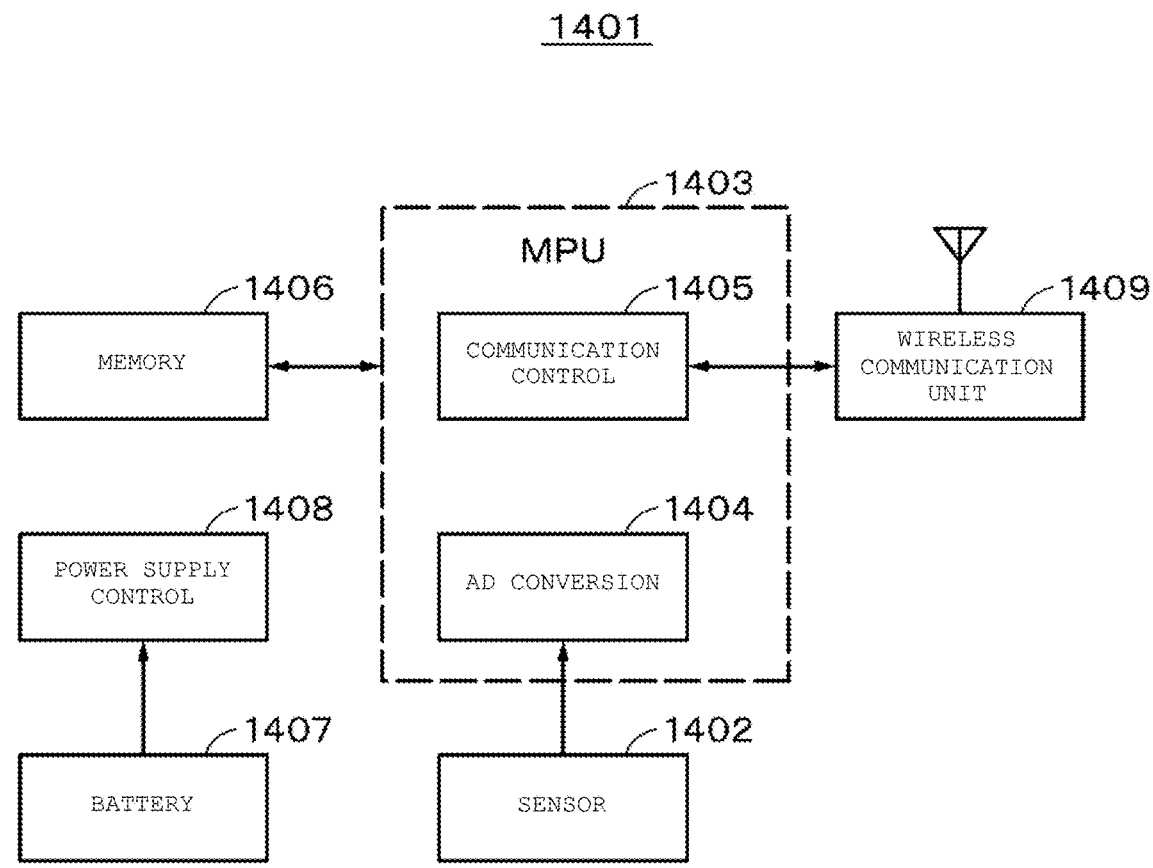
FIG. 17 is a block diagram of an example of a configuration of a wireless sensor node as an exemplary embodiment.

FIG. 17 illustrates an example of a configuration of a wireless sensor node 1401. A detection signal of a sensor 1402 is supplied to an AD conversion circuit 1404 of a microprocessor ("MPU") 1403. Various sensors described above can be used as the sensor 1402. A memory 1406 is provided in association with the microprocessor 1403. In addition, an output of the battery 1407 is supplied to a power control unit 1408, and a power supply of the wireless sensor node 1401 is managed. The battery 1407 is a battery according to any one of the first to third embodiments and the fifth embodiment and the modified examples thereof.

A program is installed on the microprocessor 1403. The microprocessor 1403 processes data of the detection result of the sensor 1402 output from the AD conversion circuit 1404 according to the program. A wireless communication unit 1409 is connected to the communication control unit 1405 of the microprocessor 1403, and the data on the detection results from the wireless communication unit 1409 are transmitted to a network terminal (not illustrated) using, for example, ZigBee® and connected to the network via the network terminal. A predetermined number of wireless sensor nodes can be connected to one network terminal. It is noted that as the form of the network, forms such as a tree type, a mesh type, and a linear type, in addition to a star type can be used.

"Wristband Type Electronic Device as Exemplary Embodiment"

Hereinafter, an exemplary embodiment in which the present disclosure is applied to a wristband type electronic device will be described.

The wristband type electronic device is also called a smart band, and is wound only around an arm and as a result can acquire data on human activities such as the number of steps, moving distance, calories burned, sleep amount, and heart rate. Furthermore, the acquired data can also be managed by a smartphone. Furthermore, the wristband type electronic device can include a mail transmitting/receiving function, and for example, can notify a user of an arrival of mail by a light emitting diode ("LED") lamp and/or vibration.

Figure 18:
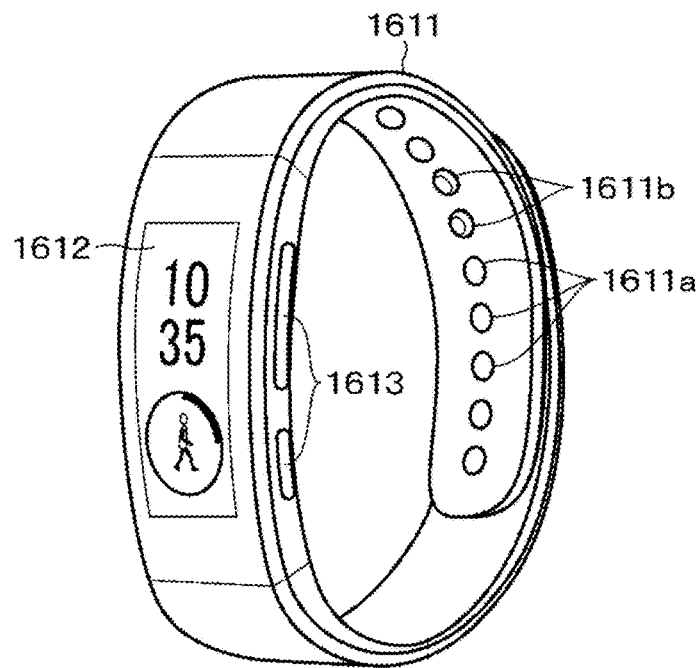
FIG. 18 is a perspective view illustrating an example of an appearance of a wristband type electronic device as an exemplary embodiment.

FIG. 18 illustrates an example of an appearance of a wristband type electronic device 1601. The electronic device 1601 is a so-called wearable device of a wrist watch type which is detachable from the human body. The electronic device 1601 includes a band portion 1611 attached on an arm, a display device 1612 which displays numbers, characters, patterns, and the like, and an operation button 1613. The band portion 1611 is provided with a plurality of hole portions 1611a and protrusions 1611b provided on an inner circumferential surface (surface on a side which contacts the arm when the electronic device 1601 is attached) thereof.

When the electronic device 1601 is in a use state, the electronic device 1601 is put on a wrist by curving the band portion 1611 so that the band portion 1611 is substantially circular as illustrated in FIG. 18 and inserting the protrusions 1611b into the hole portions 1611a. By adjusting the position of the hole portion 1611a into which the protrusion 1611b is inserted, a size of a diameter can be adjusted according to the thickness of the arm. When the electronic device 1601 is not used, the protrusion 1611b is removed from the hole portion 1611a, and the band portion 1611 keeps substantially flat. A sensor (not illustrated) is provided inside the band portion 1611 substantially over the whole of the band portion 1611.

Figure 19:
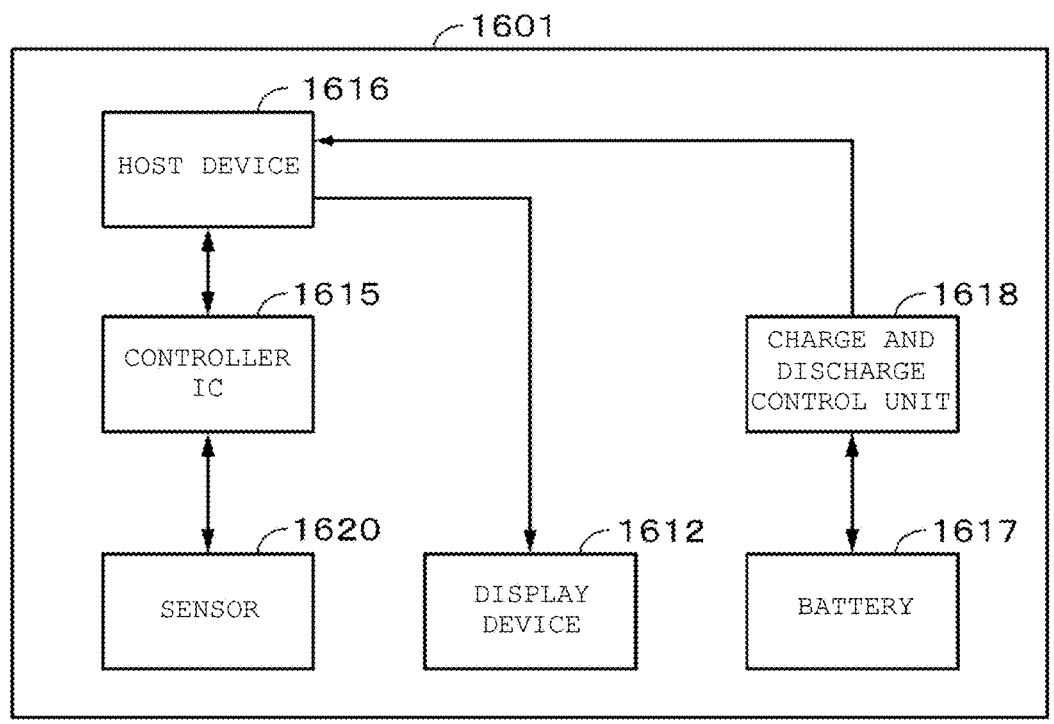
FIG. 19 is a block diagram illustrating the example of a configuration of the wristband type electronic device as an exemplary embodiment.

FIG. 19 illustrates an example of a configuration of the electronic device 1601. The electronic device 1601 includes a controller IC 1615 as a drive control unit, a sensor 1620, a host device 1616, a battery 1617 as a power source, and a charge and discharge control unit 1618, in addition to the display device 1612 described above. The sensor 1620 may include controller IC 1615.

The sensor 1620 can detect both pressing and bending. The sensor 1620 detects a change in capacitance according to the pressing, and outputs an output signal according to the change to the controller IC 1615. In addition, the sensor 1620 detects a change in a resistance value (i.e., a change in resistance) according to the bending, and outputs an output signal according to the change to the controller IC 1615. The controller IC 1615 detects the pressing and bending of the sensor 1620 based on the output signal from the sensor 1620, and outputs information corresponding to the detection result to the host device 1616.

The host device 1616 executes various pieces of processing based on the information supplied from the controller IC 1615. For example, processing such as display of character information and image information on the display device 1612, movement of a cursor displayed on the display device 1612, and scrolling of a screen are performed.

The display device 1612 is, for example, a flexible display device, and displays a video (screen) based on a video signal or a control signal supplied from the host device 1616. Examples of the display device 1612 include a liquid crystal display, an electro luminescence ("EL") display, an electronic paper, and the like, but are not limited thereto.

In an exemplary aspect, battery 1617 is provided according to any one of the first to third embodiments and the fifth embodiment and the modified examples thereof. The charge and discharge control unit 1618 controls the charge and discharge operation of the battery 1617. Specifically, the charging of the battery 1617 from an external power supply or the like is controlled. In addition, the supply of power from the battery 1617 to the host device 1616 is controlled.

"Smart Watch as Exemplary Embodiment"

Hereinafter, an exemplary embodiment in which the present disclosure is applied to a smart watch will be described.

The smart watch has the same or similar appearance as a design of the existing wrist watch, is used by being worn on a user's arm like the wrist watch, and has a function of notifying a user of various messages such as arrival of a telephone call or an electronic mail by information displayed on a display. In addition, the smart watch may have functions such as an electronic money function and an activity meter, and may have a function of performing near field communications such as a communication terminal (smartphone and the like) and Bluetooth®.

(Overall Configuration of Smart Watch)

Figure 20:
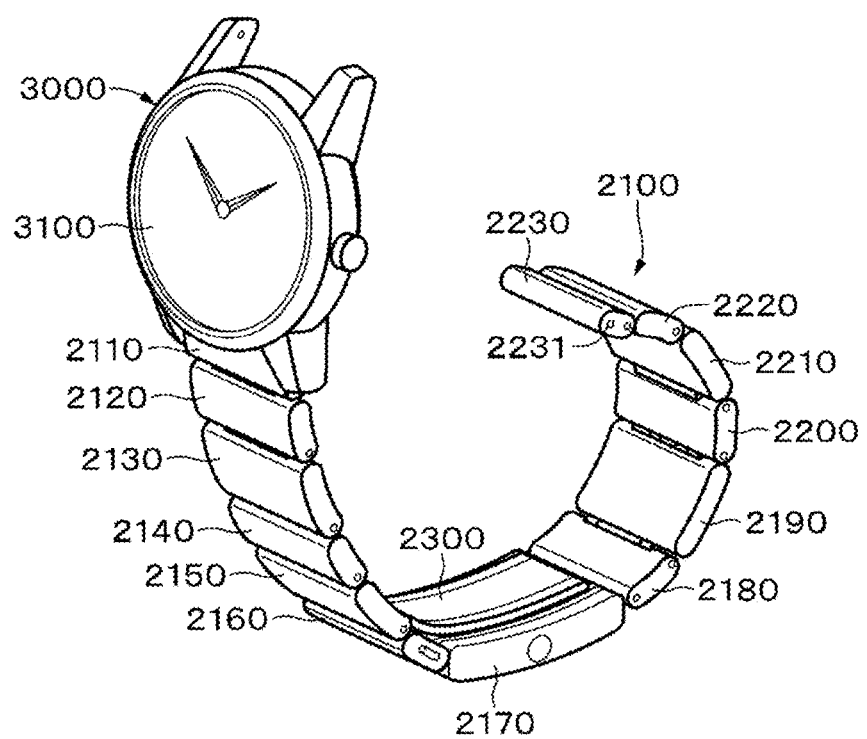
FIG. 20 is a perspective view illustrating an example of an overall configuration of a smart watch as an exemplary embodiment.

FIG. 20 illustrates an example of a configuration of a smart watch 2000. The smart watch 2000 includes a watch main body 3000 and a band type electronic device 2100. The watch main body 3000 includes a dial 3100 for displaying time. The watch main body 3000 may electrically display time on a liquid crystal display or the like instead of the dial 3100.

The band type electronic device 2100 is a metal band attached to the watch main body 3000, and worn on a user's arm. The band type electronic device 2100 has a configuration in which a plurality of segments 2110 to 2230 are connected. The segment 2110 is attached to one band attachment hole of the watch main body 3000, and the segment 2230 is attached to the other band attachment hole of the watch main body 3000. Each of the segments 2110 to 2230 is formed of metal.

Although FIG. 20 illustrates that the watch main body 3000 and the segment 2230 are a separated state in order to explain an example of the configuration of the band type electronic device 2100, the segment 2230 is attached to the watch main body 3000 in actual use. By attaching the segment 2230 to the watch main body 3000, the smart watch 2000 can be worn on a user's arm like a normal wrist watch. Connection parts of each of the segments 2110 to 2230 can be moved. Since the connection parts of the segments can be moved, the band type electronic device 2100 can be fitted to a user's arm.

A buckle portion 2300 is disposed between the segment 2170 and the segment 2160. The buckle portion 2300 extends long when a lock is unlocked and becomes short when the lock is locked. Each segment 2110 to 2230 is configured to have a plurality of types of sizes.

(Circuit Configuration of Smart Watch)

Figure 21:
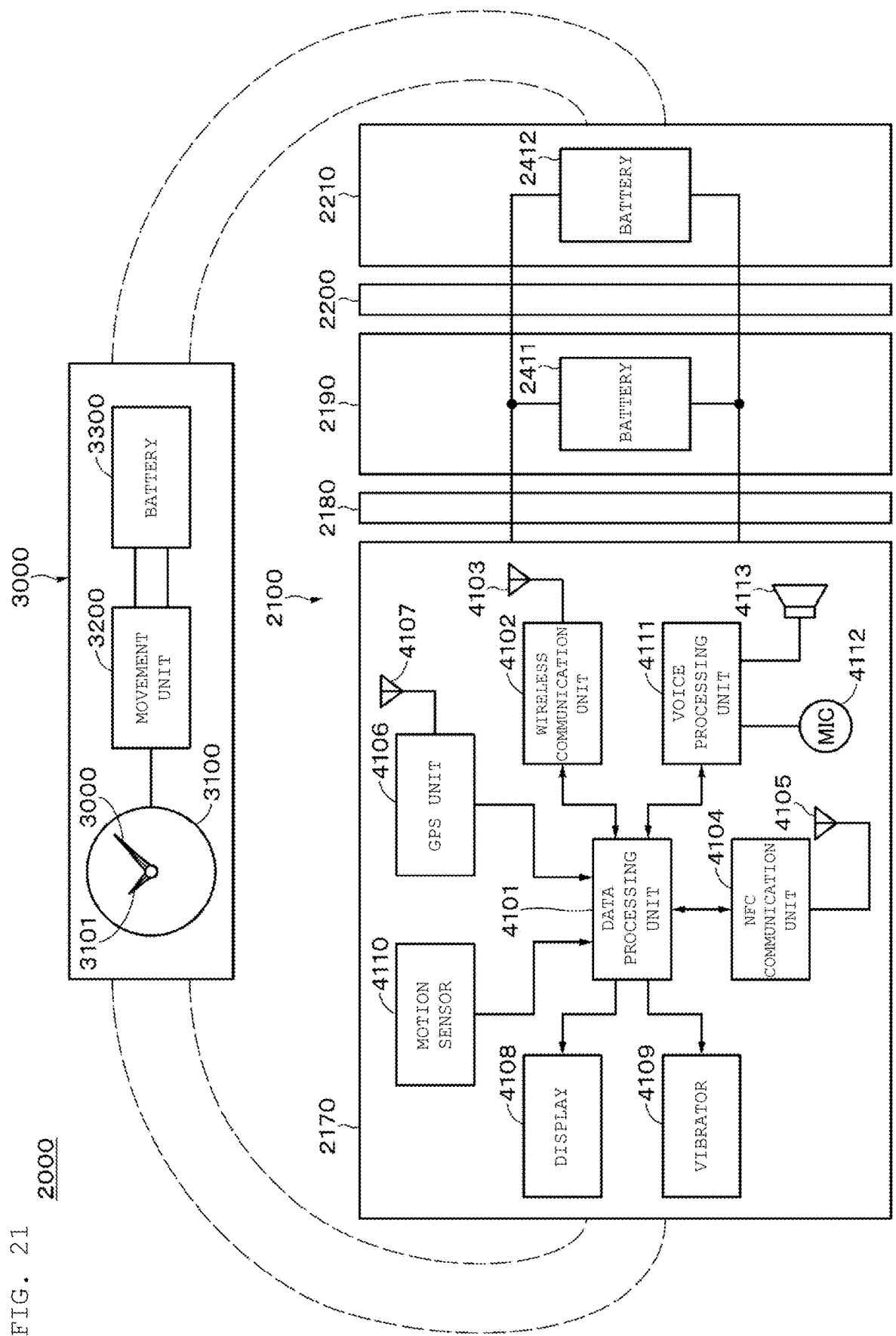
FIG. 21 is a block diagram illustrating an example of a circuit configuration of the smart watch as an exemplary embodiment.

FIG. 21 illustrates an example of a circuit configuration of the band type electronic device 2100. An internal circuit of the band type electronic device 2100 has a configuration independent of the watch main body 3000. The watch main body 3000 includes a movement unit 3200 which rotates a needle disposed on the dial 3100. A battery 3300 is connected to the movement unit 3200. The movement unit 3200 or the battery 3300 is incorporated in a housing of the watch main body 3000. The battery 3300 is a battery according to any one of the first to third embodiments and the fifth embodiment and the modified examples thereof.

Electronic components and the like are disposed in three segments 2170, 2190 and 2210 among the segments 2110 to 2230. A data processing unit 4101, a wireless communication unit 4102, an NFC communication unit 4104, and a GPS unit 4106 are disposed in the segment 2170. Antennas 4103, 4105, and 4107 are connected to the wireless communication unit 4102, the NFC communication unit 4104, and the GPS unit 4106, respectively. Each antenna 4103, 4105, and 4107 is disposed in the vicinity of a slit (not illustrated) of the segment 2170.

The wireless communication unit 4102 performs near field wireless communication with another terminal according to, for example, the Bluetooth® standard. The NFC communication unit 4104 performs wireless communication with a reader/writer close to each other according to the NFC standard. The GPS unit 4106 is a positioning unit which receives radio waves from satellites of a system called a global positioning system ("GPS") and measures a current position. Data obtained by the wireless communication unit 4102, the NFC communication unit 4104, and the GPS unit 4106 are supplied to the data processing unit 4101.

A display 4108, a vibrator 4109, a motion sensor 4110, and a voice processing unit 4111 are arranged in the segment 2170. The display 4108 and the vibrator 4109 function as a notification unit which notifies a wearer of the band type electronic device 2100. The display 4108 is configured by a plurality of light emitting diodes, and notifies a user by lighting or flickering the light emitting diodes. The plurality of light emitting diodes are disposed, for example, inside a slit (not illustrated) of the segment 2170, and the arrival of a telephone call, the reception of an electronic mail, or the like is notified by lighting or flickering the light emitting diodes. The display 4108 may be a type in which characters, numbers, and the like are displayed. The vibrator 4109 is a member for vibrating the segment 2170. The band type electronic device 2100 notifies arrival of a telephone call, reception of an electronic mail or the like by causing the vibrator 4109 to vibrate the segment 2170.

The motion sensor 4110 detects the movement of the user wearing the smart watch 2000. As the motion sensor 4110, an acceleration sensor, a gyro sensor, an electronic compass, an atmospheric pressure sensor or the like is used. In addition, the segment 2170 may also incorporate a sensor other than the motion sensor 4110. For example, a biosensor which detects a pulse or the like of a user wearing the smart watch 2000 may be incorporated. The microphone 4112 and the speaker 4113 are connected to the voice processing unit 4111, and the voice processing unit 4111 performs processing on a call with the other party connected in a wireless communication scheme by the wireless communication unit 4102. In addition, the voice processing unit 4111 can also perform processing for a voice input operation.

A battery 2411 is incorporated in the segment 2190, and a battery 2421 is incorporated in the segment 2210. The batteries 2411 and 2421 supply driving power to circuits in the segment 2170. The circuit in the segment 2170 and the batteries 2411 and 2421 are connected to each other by a flexible circuit board (not illustrated). Although not illustrated in FIG. 21, the segment 2170 includes a terminal for charging the batteries 2411 and 2421. In addition, electronic components other than the batteries 2411 and 2421 may be disposed in the segments 2190 and 2210. For example, the segments 2190 and 2210 may be provided with a circuit which controls the charging and discharging of the batteries 2411 and 2421. The battery 2411 and 2421 is a battery according to any one of the first to third embodiments and the fifth embodiment and the modified examples thereof.

"Glasses Type Terminal as Exemplary Embodiment"

Hereinafter, an exemplary embodiment in which the present disclosure is applied to a glasses type terminal represented by one type of head mounted display ("HMD") will be described.

The glasses type terminal described below can display information such as texts, symbols, and images which are superimposed on a scenery in front of eyes. That is, a lightweight and thin image display device display module dedicated to a transmissive glasses type terminal is mounted.

This image display device is configured by an optical engine and a hologram light guide plate. The optical engine uses a micro-display lens to emit image light such as images, texts and the like. This image light is incident on the hologram light guide plate. Since the hologram light guide plate has hologram optical elements incorporated at both ends of a transparent plate, the image light from the optical engine is propagated through a very thin transparent plate like a thickness of 1 mm and thus is observed by observer's eyes. With such a configuration, a lens (including a protection plate in front of and behind the light guide plate) having a thickness of 3 mm which has a transmittance of, for example, 85% is realized. Such a glasses type terminal enables a player, a team's performance and the like to be observed in real time while watching sports, and a tourist guide on a tour site can be displayed.

A specific example of the glasses type terminal includes one in which an image display unit is configured as a glasses type. That is, like normal glasses, the glasses type terminal is provided with a frame 5003 for holding a right image display unit 5001 and a left image display unit 5002 in front of eyes. The frame 5003 includes a front portion 5004 disposed in front of an observer, and two temple portions 5005 and 5006 rotatably attached to both ends of the front portion 5004 by a hinge. The frame 5003 is formed of the same material as that constituting the normal glasses, such as metal, alloy, plastic, or a combination thereof. It is noted that a headphone unit may be provided.

The right image display unit 5001 and the left image display unit 5002 are disposed to be located in front of a user's right eye and in front of a user's left eye, respectively. The temple portions 5005 and 5006 hold the right image display unit 5001 and the left image display unit 5002 on a user's head. The right display drive unit 5007 is disposed inside the temple portion 5005 at the connection part between the front portion 5004 and the temple portion 5005. The left display drive unit 5008 is disposed inside the temple portion 5006 at the connection part between the front portion 5004 and the temple portion 5006.

Figure 22:
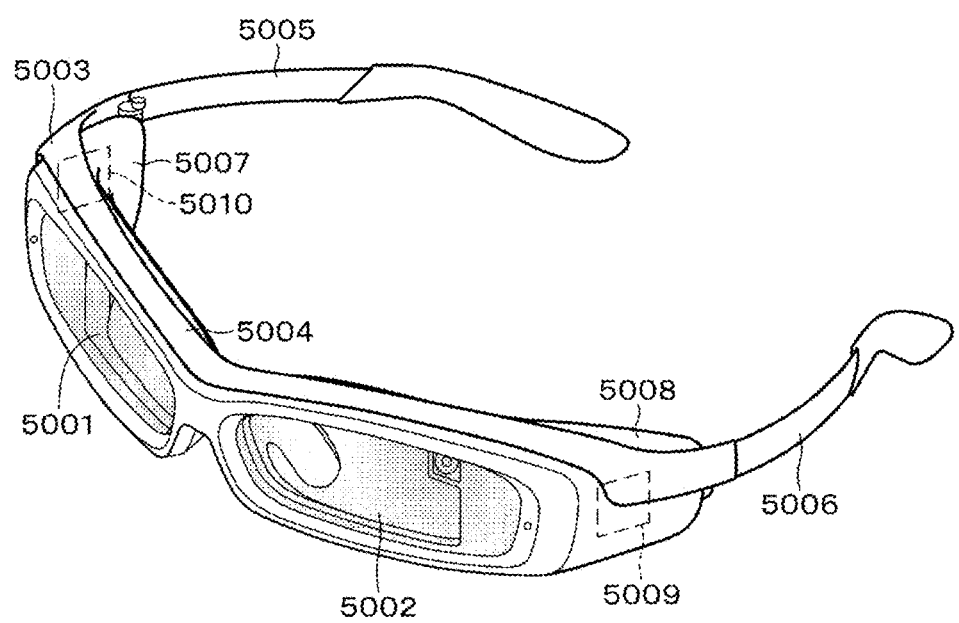
FIG. 22 is a perspective view illustrating an example of an appearance of a glasses type terminal as an exemplary embodiment.

Batteries 5009 and 5010 are provided on the frame 5003. The battery 5009 and 5010 is a battery according to any one of the first to third embodiments and the fifth embodiment and the modified examples thereof. Although omitted in FIG. 22, the frame 5003 is provided with an acceleration sensor, a gyro, an electronic compass, a microphone/speaker, and the like. Furthermore, the frame 5003 is provided with an imaging device to be capable of shooting a still image/moving image. Furthermore, the frame 5003 is provided with a controller connected to the glasses unit by, for example, a wireless or wired interface. The controller is provided with a touch sensor, various buttons, a speaker, a microphone, and the like. Furthermore, the frame 5003 has a cooperation function with a smartphone. For example, it is possible to provide information according to the user's situation by utilizing the GPS function of the smartphone. Hereinafter, the image display apparatus (the right image display unit 5001 or the left image display unit 5002) will be mainly described.

Figure 23:
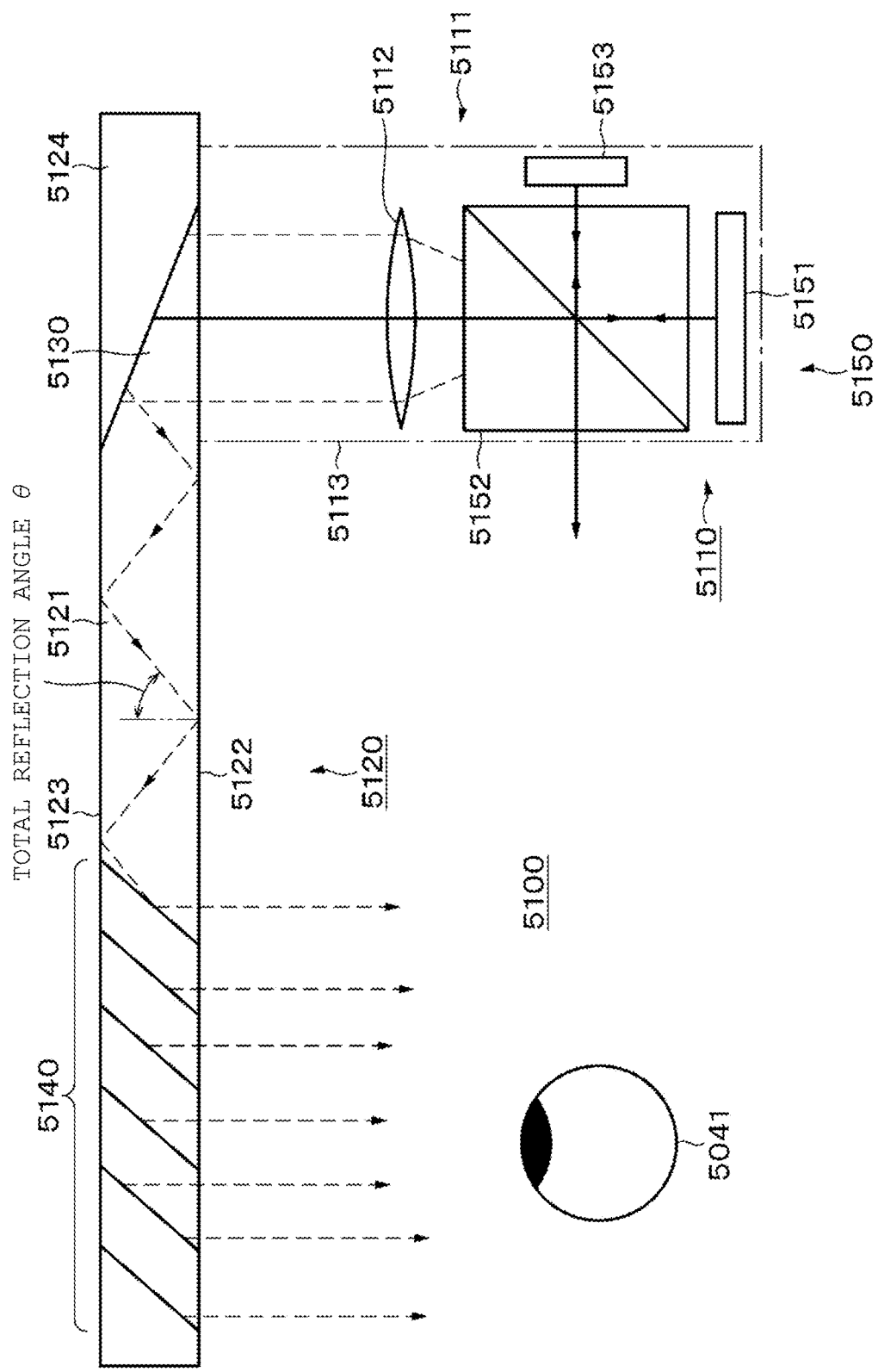
FIG. 23 is a schematic diagram illustrating an example of a configuration of an image display device of the glasses type terminal as an exemplary embodiment.

FIG. 23 illustrates an example of a configuration of an image display device (right image display unit 5001 or left image display unit 5002) of the glasses type terminal. The image display device 5100 includes an image generation device 5110 and an optical device (light guide unit) 5120 which gets light emitted from the image generation device 5110 to be incident and guided there into and emits the light toward a pupil 5041 of an observer. The optical device 5120 is attached to the image generation device 5110.

The optical device 5120 is an optical device having a first configuration, and includes a light guide plate 5121 through which light incident from the image generation device 5110 is propagated by total reflection and is then emitted toward the pupil 5041 of the observer, a first deflector 5130 which deflects the light incident on the light guide plate 5121 so that the light incident on the light guide plate 5121 is totally reflected inside the light guide plate 5121, and a second deflector 5140 which deflects the light propagated by the total reflection in the light guide plate 5121 plural times in order to emit light, which is propagated by total reflection in the light guide plate 5121, from the light guide plate 5121.

The first deflector 5130 and the second deflector 5140 are disposed inside the light guide plate 5121. Then, the first deflector 5130 reflects the light incident on the light guide plate 5121, and the second deflector 5140 transmits and reflects the light propagated by the total reflection in the light guide plate 5121 plural times. That is, the first deflector 5130 functions as a reflecting mirror, and the second deflector 5140 functions as a semitransparent mirror. More specifically, the first deflector 5130 provided inside the light guide plate 5121 is formed of aluminum, and is constituted by a light reflection film (a kind of mirror) which reflects the light incident on the light guide plate 5121. On the other hand, the second deflector 5140 provided inside the light guide plate 5121 is constituted by a multilayer laminated structure in which a large number of dielectric laminated films are laminated. The dielectric laminated film is constituted by, for example, a $TiO_2$ film as a high dielectric constant material and an $SiO_2$ film as a low dielectric constant material.

A flake formed of the same material as that of the light guide plate 5121 is sandwiched between the dielectric laminated films. In the first deflector 5130, parallel light incident on the light guide plate 5121 is reflected (or diffracted) so that the parallel light is totally reflected inside the light guide plate 5121. On the other hand, in the second deflector 5140, the parallel light propagated by the total reflection in the light guide plate 5121 is reflected (or diffracted) plural times and emitted from the light guide plate 5121 in the state of parallel light.

The light guide plate 5121 is provided with an inclined surface on which the first deflector 5130 is to be formed by cutting out a portion 5124 provided with the first deflector 5130 of the light guide plate 5121, and after the light reflection film is provided on the inclined surface by vacuum deposition, the cut-out portion 5124 of the light guide plate 5121 may be bonded to the first deflector 5130. Further, in the second deflector 5140, the multilayer laminated structure in which the same material (for example, glass) as the material constituting the light guide plate 5121 and the dielectric laminated film (for example, film formation can be performed by the vacuum evaporation) is stacked in plural is produced, the inclined surface is formed by cutting out a portion 5125 provided with the second deflector 5140 of the light guide plate 5121, and the inclined surface is bonded to the multilayer laminated structure and subjected to polishing and the like to arrange an appearance. By doing so, the optical device 5120 in which the first deflector 5130 and the second deflector 5140 are provided inside the light guide plate 5121 can be obtained.

The light guide plate 5121 formed of optical glass or a plastic material is provided with two parallel surfaces (a first surface 5122 and a second surface 5123) extending in parallel with an axis of the light guide plate 5121. The first surface 5122 and the second surface 5123 face each other. Then, parallel light is incident from the first surface 5122 corresponding to the light incident surface, propagates in the inside by total reflection, and then is emitted from the first surface 5122 corresponding to the light emitting surface.

In addition, the image generation device 5110 is constituted by the image generation device of the first configuration, and includes an image forming device 5111 which has a plurality of pixels arranged in a two-dimensional matrix form and a collimating optical system 5112 which emits the light emitted from each pixel of the image forming device 5111 as the parallel light.

Here, an image forming device 5111 includes a reflective spatial light modulator 5150 and a light source 5153 constituted by a light emitting diode for emitting white light. More specifically, the reflective spatial light modulator 5150 is configured by a liquid crystal display device ("LCD") 5151, which is formed of liquid crystal on silicon ("LCOS"), as a light valve, and a polarization beam splitter 5152 which reflects a part of light from the light source 5153 and guides the reflected light to the liquid crystal display device 5151 and passes a part of the light reflected by the liquid crystal display device 5151 and guides the passed light to the collimating optical system 5112. The LCD is not limited to the LCOS type.

The liquid crystal display device 5151 includes a plurality (for example, 320×240) of pixels arranged in a two-dimensional matrix form. The polarization beam splitter 5152 has a known configuration and structure. The unpolarized light emitted from the light source 5153 collides with the polarization beam splitter 5152. In the polarization beam splitter 5152, a P-polarization component passes through and is emitted out of the system. On the other hand, an S-polarization component is reflected by the polarization beam splitter 5152, incident on the liquid crystal display device 5151, reflected inside the liquid crystal display device 5151, and emitted from the liquid crystal display device 5151. Here, among the light emitted from the liquid crystal display device 5151, light emitted from a pixel displaying "white" contains a large amount of P-polarization component, and light emitted from a pixel displaying "black" includes a large amount of S-polarization component. Accordingly, the P-polarization component of the light emitted from the liquid crystal display device 5151 and colliding with the polarization beam splitter 5152 passes through the polarization beam splitter 5152 and is guided to the collimating optical system 5112.

On the other hand, the S-polarization component is reflected at the polarization beam splitter 5152 and returned to the light source 5153. The liquid crystal display device 5151 includes, for example, a plurality (for example, 320×240) of pixels (the number of liquid crystal cells is three times the number of pixels) arranged in a two-dimensional matrix form. The collimating optical system 5112 is constituted by, for example, a convex lens, and an image forming device 5111 (more specifically, a liquid crystal display device 5151) is disposed at a place (position) of a focal distance in the collimating optical system 5112 in order to generate parallel light. In addition, one pixel is constituted by a red light emission sub-pixel which emits red light, a green light emission sub-pixel which emits green light, and a blue light emission sub-pixel which emits blue light.

"Storage System in Vehicle as Exemplary Embodiment"

Figure 24:
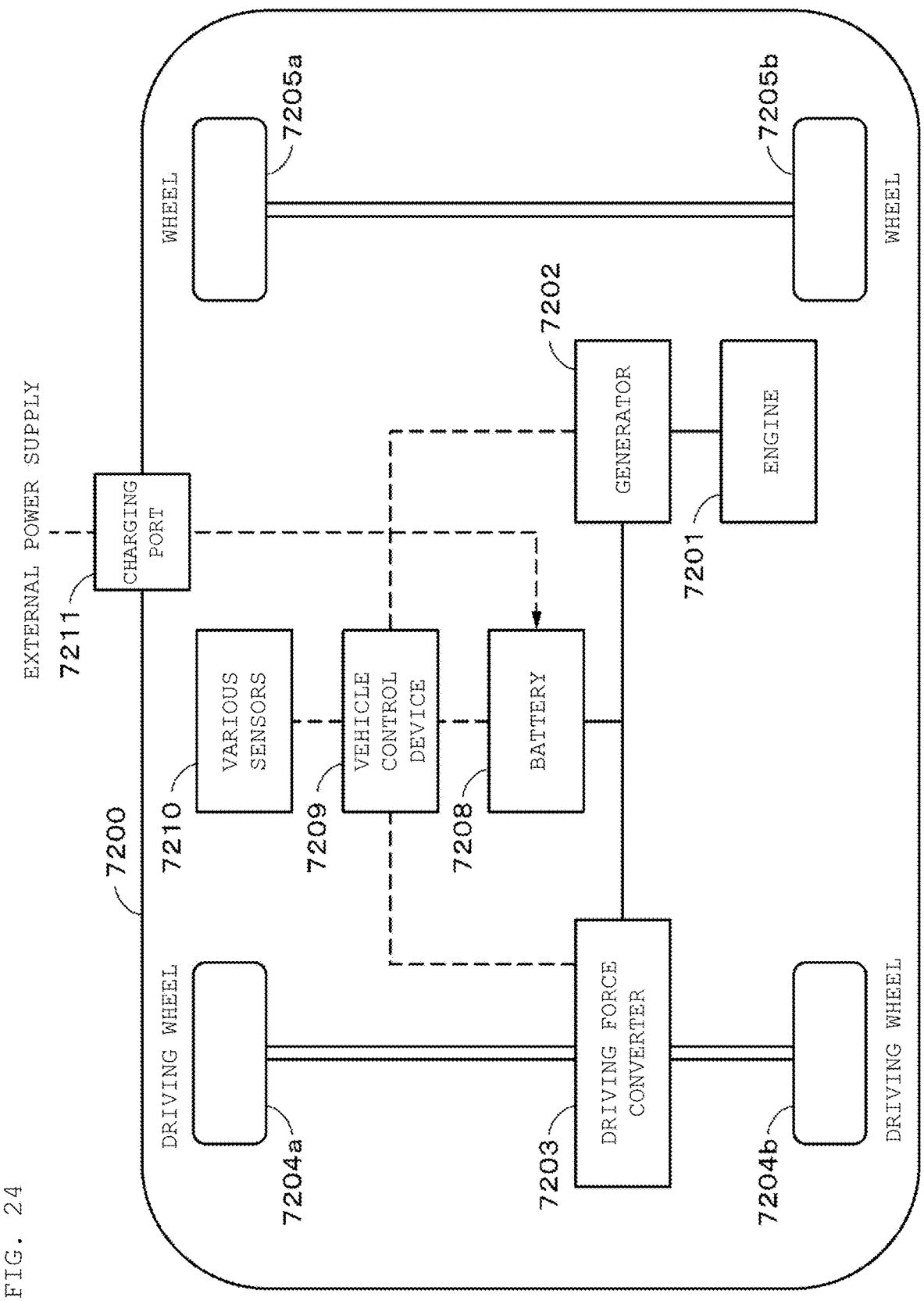
FIG. 24 is a schematic diagram illustrating an example of a configuration of a storage system of a vehicle as an exemplary embodiment.

The example in which the present disclosure is applied to a storage system for a vehicle will be described with reference to FIG. 24. FIG. 24 schematically illustrates an example of a configuration of a hybrid car that employs a series hybrid system to which the present disclosure is applied. The series hybrid system is a vehicle which travels by a power and driving force converter which uses power generated by a generator driven by an engine or the power once stored in a battery.

A hybrid car 7200 includes an engine 7201, a generator 7202, a power and driving force converter 7203, a driving wheel 7204a, a driving wheel 7204b, a wheel 7205a, a wheel 7205b, a battery 7208, a vehicle control device 7209, various sensors 7210, a charging port 7211. The power storage device of the present disclosure described above is applied to the battery 7208.

The hybrid car 7200 travels using the power and driving force converter 7203 as a power source. An example of the power and driving force converter 7203 is a motor. The power and driving force converter 7203 is operated by the power of the battery 7208, and the rotational force of the power and driving force converter 7203 is transmitted to the driving wheels 7204a and 7204b. Note that by using direct current to alternating current (i.e., DC to AC) or reverse conversion (i.e., AC to DC conversion) at necessary places, the power and driving force converter 7203 can be applied to either an alternating current motor or a direct current motor. Various sensors 7210 control an engine speed and an opening degree (e.g., throttle opening degree) of a throttle valve (not illustrated) using the vehicle control device 7209 Various sensors 7210 include a speed sensor, an acceleration sensor, an engine speed sensor, and the like.

A rotational force of the engine 7201 is transmitted to the generator 7202, and the power generated by the rotational force in the generator 7202 can be stored in the battery 7208.

When the hybrid car is decelerated by a braking mechanism (not illustrated), a resistance force at the time of deceleration is applied as a rotational force to the power and driving force converter 7203, and regenerative power generated by the rotational force in the power and driving force converter 7203 is stored in battery 7208.

The battery 7208 is connected to a power supply outside the hybrid car and therefore the charging port 211 as an input port can receive power from the external power supply, so the battery 7208 can store the received power.

Although not illustrated, an information processing apparatus performing information processing related to a vehicle control based on information on a secondary battery may be provided. Examples of the information processing apparatus include an information processing apparatus which displays a battery remaining quantity based on information on a battery remaining quantity.

In the above description, the series hybrid car traveling by a motor using the power generated by the generator driven by the engine or the power once stored in the battery has been described as an example. However, the present disclosure can effectively be applied to a parallel hybrid car in which both the outputs of the engine and the motor are drive sources, and thus three modes of traveling the parallel hybrid car only by the engine, traveling the parallel hybrid car only by the motor, and traveling the parallel hybrid car by the engine and the motor travel are appropriately switched and used. Furthermore, the present disclosure can be effectively applied to a so-called electric motor vehicle which travels only by a drive motor without using the engine.

The example of the hybrid car 7200 to which the technology according to the present disclosure can be applied has described above. The technology according to the present disclosure can be suitably applied to the battery 7208 among the configurations described above.

"Storage System for House as Exemplary Embodiment"

Figure 25:
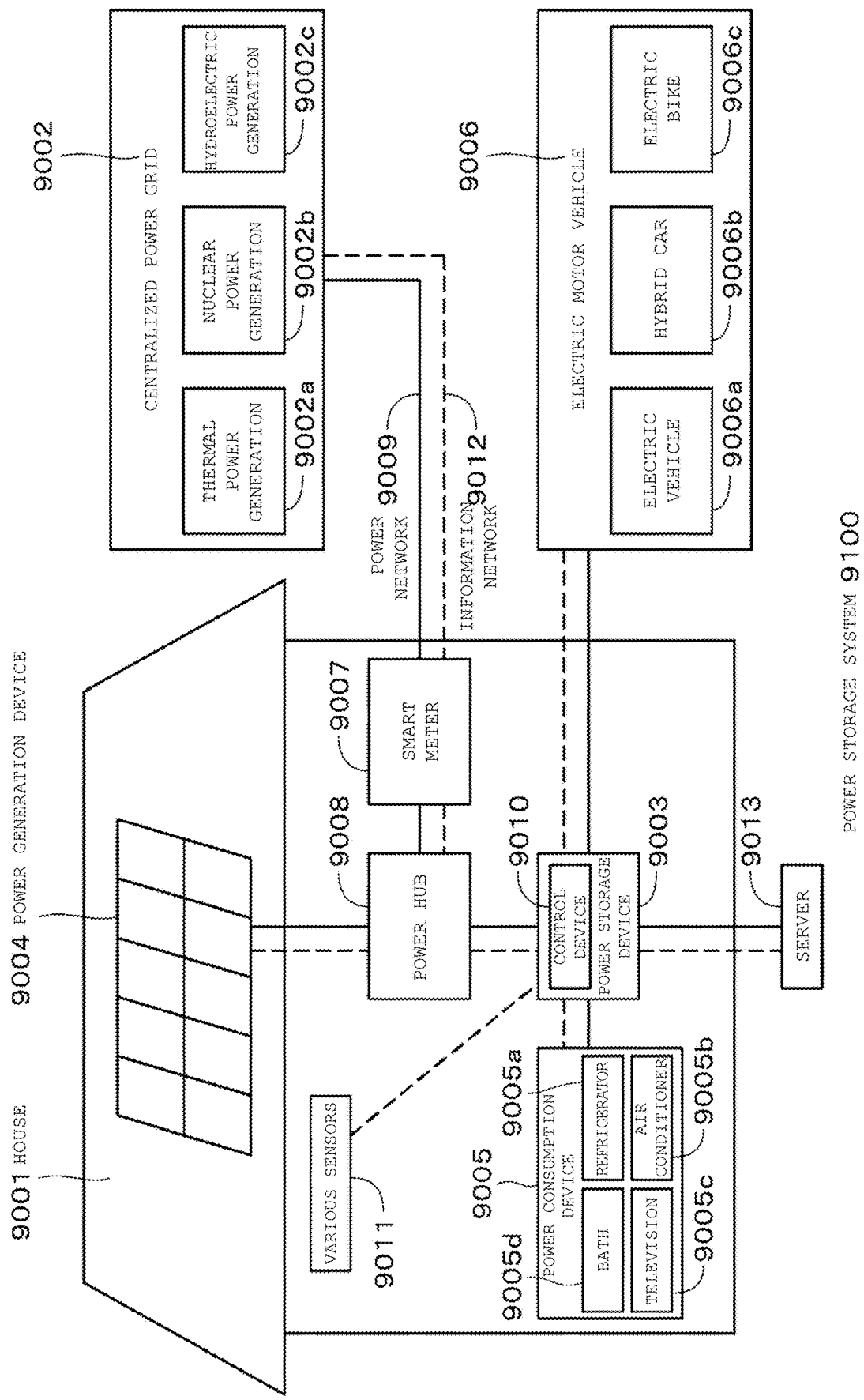
FIG. 25 is a schematic diagram illustrating an example of a configuration of a storage system of a house as an exemplary embodiment.

The example in which the present disclosure is applied to a storage system for a house will be described with reference to FIG. 25. For example, in a storage system 9100 for a house 9001, power is supplied from centralized power grid 9002 such as thermal power generation 9002a, nuclear power generation 9002b, and hydroelectric power generation 9002c and the like to a power storage device 9003 via a power network 9009, an information network 9012, a smart meter 9007, a power hub 9008 and the like. At the same time, power is supplied to the power storage device 9003 from an independent power supply such as a household power generation device 9004. Power supplied to the power storage device 9003 is stored. The power storage device 9003 is used to supply power used in a house 9001. The same storage system can be used not only for the house 9001 but also for a building.

The house 9001 is provided with a power generation device 9004, a power consumption device 9005, a power storage device 9003, a control device 9010 for controlling each device, a smart meter 9007, and a sensor 9011 for acquiring various information. Each of the devices are connected to each other by a power network 9009 and an information network 9012. A solar cell, a fuel cell, or the like is used as the power generation device 9004, and the generated power is supplied to the power consumption device 9005 and/or the power storage device 9003. The power consumption device 9005 is, for example, a refrigerator 9005a, an air conditioner 9005b, a television receiver 9005c, a bath 9005d and the like. Furthermore, the power consumption device 9005 includes an electric motor vehicle 9006. The electric motor vehicle 9006 is an electric vehicle 9006a, a hybrid car 9006b, and an electric bike 9006c.

The battery unit of the present disclosure described above is applied to the power storage device 9003. The power storage device 9003 is constituted by a secondary battery or a capacitor. For example, the power storage device 9003 is constituted by a lithium ion battery. The lithium ion battery may be a stationary type or may be used in the electric motor vehicle 9006. The smart meter 9007 has a function of measuring a usage amount of commercial power and transmitting the measured usage amount to a power company. The power network 9009 may be one of direct current feed, alternating current feed, and non-contact feed or combinations thereof.

Various sensors 9011 are, for example, a human touch sensor, an illuminance sensor, an object detection sensor, a power consumption sensor, a vibration sensor, a contact sensor, a temperature sensor, an infrared sensor, and the like. Information acquired by various sensors 9011 is transmitted to the control device 9010. By the information from the sensor 9011, a state of weather, a state of a person and the like are understood, and the power consumption device 9005 can be automatically controlled to minimize energy consumption. Furthermore, the control device 9010 can transmit the information on the house 9001 to an external power company or the like via the Internet.

The power hub 9008 performs processing such as branching of power lines and DC/AC conversion. As a communication system of the information network 9012 connected to the control device 9010, there are a method of using communication interfaces such as universal asynchronous receiver-transmitter (e.g., UART: transmitter and receiver circuit for asynchronous serial communication), and a method of using a sensor network based on wireless communication standards such as Bluetooth®, ZigBee®, and Wi-Fi The Bluetooth® system is applied to multimedia communication, and can perform one-to-many connection communication. ZigBee® uses a physical layer of Institute of Electrical and Electronics Engineers (IEEE) 802.15.4. IEEE 802.15.4 is a name of a short distance wireless network standard called a personal area network (PAN) or wireless PAN.

The control device 9010 is connected to an external server 9013. The server 9013 may be managed by any one of a house 9001, a power company, and a service provider. The information transmitted and received by the server 9013 is, for example, power consumption information, life pattern information, power rates, weather information, natural disaster information, and information on power transactions. These pieces of information may be transmitted and received from a household power consumption device (for example, a television receiver), but may be transmitted and received from devices (for example, a mobile phone and the like) outside the home. These pieces of information may be displayed on devices having a display function, for example, a television receiver, a mobile phone, personal digital assistants ("PDA"), or the like.

The control device 9010 that controls each unit is constituted by a central processing unit ("CPU"), a random access memory ("RAM"), a read only memory ("ROM"), and the like, and is stored in the power storage device 9003 in this example. The control device 9010 is connected to the power storage device 9003, the household power generation device 9004, the power consumption device 9005, various sensors 9011, and the server 9013 via the information network 9012, and has a function of adjusting, for example, the usage amount of commercial power and the power generation amount. In addition, the control device 9010 may include a function, which performs transactions in an electric power market, and the like.

As described above, the power storage device 9003 may store the generated power of not only the centralized power grid 9002 such as the thermal power 9002a, the nuclear power 9002b, and the hydroelectric power 9002c but also the household power generation device 9004 (e.g., solar power generation, wind power generation). Therefore, even if the power generated by the household power generation device 9004 fluctuates, control can be performed so that the amount of power to be transmitted to the outside can be made constant, or the discharge can be performed as much as necessary. For example, a method of storing power obtained by a solar power generation in the power storage device 9003, and storing cheap off-peak electricity in night time in the power storage device 9003 and discharging electricity stored in the power storage device 9003 in the time zone of day time where an electricity charge is high can be used.

In this example, although the example in which the control device 9010 is stored in the power storage device 9003 has been described, the control device 9010 may be stored in the smart meter 9007 or may be configured alone. Furthermore, the power storage system 9100 may be used for a plurality of households in an apartment house, or may be used for a plurality of detached houses.

The example of the power storage system 9100 to which the technology according to the present disclosure can be applied has been described above. The technology according to the present disclosure can be suitably applied to the secondary battery of the power storage device 9003 among the configurations described above.

As mentioned above, although the embodiments and the modified examples of this technology, were described in detail, this technology is not limited to the embodiments and the modified examples thereof, and the Examples described above, but various modifications can be made based on the technical ideas.

For example, the configurations, methods, processes, shapes, materials, numerical values, and the like described in the embodiments and the modified examples thereof, and Examples described above are merely examples, and different configurations, methods, processes, shapes, materials, numerical values, and the like may be used as needed. In addition, chemical formulas of compounds and the like are representative ones, and are not limited to the indicated valences and the like as long as they are common names of the same compounds.

In addition, the configurations, methods, processes, shapes, materials, numerical values, and the like of the embodiments and the modified examples thereof, and the examples described above can be combined with one another without departing from the spirit of the present invention.

In addition, the exemplary embodiments of present disclosure is applicable to various electronic devices provided with a battery, and is not limited to the electronic devices described in the exemplary embodiments described above. Examples of the electronic devices other than the exemplary embodiments described above include a notebook personal computer, a tablet computer, mobile phones (for example, smart phone and the like), personal digital assistants ("PDA"), display devices (e.g., LCD, EL display, electronic paper, and the like), imaging devices (for example, digital still camera, digital video camera, and the like), audio devices (for example, portable audio player), a game machine, a cordless handset, an electronic book, an electronic dictionary, a radio, a headphones, a navigation system, a memory card, a pacemakers, a hearing aid, an electric tool, an electric shaver, a refrigerator, an air conditioner, a televisions, stereo, a water heater, a microwave oven, a dishwasher, a washing machine, a dryer, a lighting device, a toy, a medical device, a robot, a road conditioner, a traffic light, and the like, but are not limited thereto.

DESCRIPTION OF REFERENCE SYMBOLS 11, 11A: Exterior battery element
11SA: First end face
11SB: Second end face
12: Cathode terminal
13: Anode terminal
14: Exterior member
20, 30: Battery element
21, 24, 31: Cathode layer
22, 25, 32: Anode layer
23: Solid electrolyte layer
24A: Cathode current collection layer
24B: Cathode active material layer
25A: Anode current collecting layer
25B: Anode active material layer
111: Core grain
112: Cover layer

The invention claimed is:
1. An all-solid-state battery, comprising:
a cathode layer having surface irregularities;
an anode layer having surface irregularities; and
a solid electrolyte layer disposed between the cathode and anode layers,
wherein the solid electrolyte layer comprises a porosity that is equal to or less than 10%, and
wherein the cathode layer comprises a surface roughness Rz1 from the respective surface irregularities, and the anode layer comprises a surface roughness Rz2 from the respective surface irregularities, such that Rz1+Rz2<25 μm,
wherein at least one of the cathode layer and the anode layer is an electrode layer that comprises a solid electrolyte having a concentration distribution, such that a concentration of the solid electrolyte on a principal surface of the electrode layer is higher than a concentration of the solid electrolyte in an inside of the electrode layer.
2. The all-solid-state battery according to claim 1, wherein the all-solid-state battery comprises a thickness between 1 μm and 20 μm.
3. The all-solid-state battery according to claim 1, wherein the solid electrolyte layer comprises a lithium ion conductive glass.
4. The all-solid-state battery according to claim 1,
wherein at least one of the cathode layer and the anode layer is an electrode layer that comprises a conductive auxiliary agent having a concentration distribution, and
wherein a concentration of the conductive auxiliary agent in an inside of the electrode layer is higher than a concentration of the conductive auxiliary agent on a main surface of the electrode layer.
5. The all-solid-state battery according to claim 1,
wherein at least one of the cathode layer and the anode layer is an electrode layer that comprises a conductive auxiliary agent having a concentration distribution, and
wherein a concentration of the conductive auxiliary is increased from a surface of the electrode layer towards an inside of the electrode layer.
6. The all-solid-state battery according to claim 1,
wherein at least one of the cathode layer and the anode layer is an electrode layer that comprises an active material having a concentration distribution, and
wherein a concentration of the active material layer on the main surface of the electrode layer is higher than a concentration of the active material in an inside of the electrode layer.
7. The all-solid-state battery according to claim 1,
wherein at least one of the cathode layer and the anode layer is an electrode layer that comprises an active material having a concentration distribution, and
wherein a concentration of the active material increases from an inside of the electrode layer towards a surface of the electrode layer.
8. The all-solid-state battery according to claim 1,
wherein at least one of the cathode layer and the anode layer is an electrode layer that comprises the solid electrolyte having a concentration distribution, and
wherein a concentration of the solid electrolyte increases from an inside of the electrode layer toward a principal surface of the electrode layer.
9. The all-solid-state battery according to claim 1, wherein the anode layer contains the solid electrolyte and an anode active material, and an average aspect ratio of the anode active material is between 2 and 10.
10. The all-solid-state battery according to claim 9, wherein the anode active material is graphite that includes at least one of natural graphite, artificial graphite, and graphitized mesocarbon microbeads.
11. The all-solid-state battery according to claim 9, further comprising oxide glass ceramic that comprises at least one of Li, Si, and B.
12. The all-solid-state-battery according to claim 9, wherein the anode layer comprises a porosity on a cross section thereof that is 20% or less.
13. The all-solid-state-battery according to claim 9, wherein a layer of the anode active material occupies an area on a cross section of the anode layer that is equal to or greater than an area occupied by the solid electrolyte on the cross section of the anode layer.
14. The all-solid-state-battery according to claim 9, wherein the solid electrolyte is sintered.
15. The all-solid-state-battery according to claim 1, wherein at least one of the cathode layer, the anode layer, and the solid electrolyte layer comprises a composite grain that includes a core grain containing a crystalline solid electrolyte, and a cover layer containing a glass-based solid electrolyte that covers at least a part of a surface of the core particle.
16. The all-solid-state-battery according to claim 15, wherein the crystalline solid electrolyte comprises at least one of oxide, nitride, and halide.
17. The all-solid-state-battery according to claim 15, wherein the cover layer comprises a grain containing the glass-based solid electrolyte.
18. The all-solid-state-battery according to claim 15,
wherein a lithium ion conductivity of the crystalline solid electrolyte is higher than a lithium ion conductivity of the glass-based solid electrolyte, and wherein a softening point of the crystalline solid electrolyte is higher than a softening point of the glass-based solid electrolyte.

19. An electric motor vehicle, comprising:
an all-solid-state battery including:
   a cathode layer having surface irregularities;
   an anode layer having surface irregularities; and
   a solid electrolyte layer disposed between the cathode and anode layers,
   wherein the solid electrolyte layer comprises a porosity that is equal to or less than 10%, and
   wherein the cathode layer comprises a surface roughness $Rz1$ from the respective surface irregularities, and the anode layer comprises a surface roughness $Rz2$ from the respective surface irregularities, such that $Rz1+Rz2<25$ µm;
a conversion device that is supplied with power provided by the all-solid-state battery and that is configured to convert the power into a driving force of a vehicle; and
a control device configured to process information on a vehicle control based on information related to the all-solid-state battery,
wherein at least one of the cathode layer and the anode layer is an electrode layer that comprises a solid electrolyte having a concentration distribution, such that a concentration of the solid electrolyte on a principal surface of the electrode layer is higher than a concentration of the solid electrolyte in an inside of the electrode layer.

* * * * *